United States Patent
Crary et al.

(10) Patent No.: US 9,212,440 B2
(45) Date of Patent: Dec. 15, 2015

(54) NATURAL WOOL PILE FABRIC AND METHOD FOR MAKING WOOL PILE FABRIC

(71) Applicants: Nathan Crary, Portland, OR (US);
Stuart Jenkins, Goleta, CA (US);
Stephen Martin, Mendham, NJ (US);
Zihao Dong, Shijiazhuang (CN)

(72) Inventors: Nathan Crary, Portland, OR (US);
Stuart Jenkins, Goleta, CA (US);
Stephen Martin, Mendham, NJ (US);
Zihao Dong, Shijiazhuang (CN)

(73) Assignee: DECKERS OUTDOOR CORPORATION, Goleta, CA (US)

( * ) Notice: Subject to any disclaimer, the term of this patent is extended or adjusted under 35 U.S.C. 154(b) by 368 days.

(21) Appl. No.: 13/838,551

(22) Filed: Mar. 15, 2013

(65) Prior Publication Data
US 2013/0255048 A1    Oct. 3, 2013

Related U.S. Application Data

(60) Provisional application No. 61/722,994, filed on Nov. 6, 2012, provisional application No. 61/680,608, filed on Aug. 7, 2012, provisional application No. 61/651,922, filed on May 25, 2012, provisional application No. 61/618,470, filed on Mar. 30, 2012.

(51) Int. Cl.
*D06C 11/00*    (2006.01)
*D06C 13/00*    (2006.01)
(Continued)

(52) U.S. Cl.
CPC .............. *D06C 11/00* (2013.01); *A43B 23/07* (2013.01); *B29D 35/142* (2013.01); *D01G 1/00* (2013.01);
(Continued)

(58) Field of Classification Search
CPC .......... D06C 15/00; D06C 13/00; D06C 7/00; D06C 15/02; D06C 11/00; D04B 1/02; D04B 1/14; D04B 1/04; D04B 21/04; D04B 1/025; D06B 1/00
USPC ............ 26/2 R, 15 R; 28/159, 160, 165, 167, 28/169; 69/22, 23, 28; 8/94.14
See application file for complete search history.

(56) References Cited

U.S. PATENT DOCUMENTS 1,952,407 A * 3/1934 Beaty .............................. 26/69 R
2,247,308 A * 6/1941 Redman .......................... 428/93
(Continued)

FOREIGN PATENT DOCUMENTS

CN    1091487 A    8/1994
CN    1127811 A    7/1996
(Continued)

OTHER PUBLICATIONS

Chinese Office Action for Chinese Patent Application No. 201380002017.4 dated Sep. 30, 2015 and English translation.
(Continued)

*Primary Examiner* — Amy Vanatta
(74) *Attorney, Agent, or Firm* — Greer, Burns & Crain, Ltd.

(57) ABSTRACT

A method of making a sheared wool, deep pile fabric that closely resembles natural sheepskin fleece that includes forming a length of wool pile fabric having natural wool fibers on one side and a scrim on an opposing side and finishing the wool pile fabric as natural shearling. The finishing process includes polishing the wool fiber side of the pile fabric by guiding the length of pile fabric over one or more heated first polishing rolls, applying a sheepskin conditioning solution to the wool fiber side of the pile fabric, further polishing the wool fiber side of the pile fabric by guiding the fabric a plurality of times over one or more second heated polishing rolls, and cutting the wool fibers to a designated length.

21 Claims, 26 Drawing Sheets

(51) Int. Cl.
*D06C 15/00* (2006.01)
*D06B 1/00* (2006.01)
*D01G 1/00* (2006.01)
*D01G 15/00* (2006.01)
*D01G 19/06* (2006.01)
*D04B 1/16* (2006.01)
*D04B 1/22* (2006.01)
*D04B 1/04* (2006.01)
*D04B 21/04* (2006.01)
*D04B 21/08* (2006.01)
*B29D 35/14* (2010.01)
*D04B 1/24* (2006.01)
*D04B 21/14* (2006.01)
*A43B 23/07* (2006.01)
*D04B 1/02* (2006.01)
*D01G 21/00* (2006.01)

(52) U.S. Cl.
CPC ............... *D01G 15/00* (2013.01); *D01G 19/06* (2013.01); *D01G 21/00* (2013.01); *D04B 1/025* (2013.01); *D04B 1/04* (2013.01); *D04B 1/16* (2013.01); *D04B 1/22* (2013.01); *D04B 1/24* (2013.01); *D04B 21/04* (2013.01); *D04B 21/08* (2013.01); *D04B 21/14* (2013.01); *D06B 1/00* (2013.01); *D06C 13/00* (2013.01)

(56) References Cited

U.S. PATENT DOCUMENTS

| | | | | |
|---|---|---|---|---|
| 2,395,217 A | * | 2/1946 | Ford et al. | 118/606 |
| 2,496,631 A | | 2/1950 | Leupold et al. | |
| 2,501,435 A | * | 3/1950 | Caspe | 28/159 |
| 2,587,505 A | | 2/1952 | Moody | |
| 2,712,683 A | * | 7/1955 | Gaunt et al. | 28/159 |
| 2,737,702 A | | 3/1956 | Schmidt et al. | |
| 2,917,807 A | | 12/1959 | Scholl | |
| 2,941,859 A | | 6/1960 | Fein et al. | |
| 3,051,544 A | * | 8/1962 | Von Bergen et al. | 8/127.6 |
| 3,403,433 A | * | 10/1968 | Schoeneberg | 28/162 |
| 3,477,803 A | | 11/1969 | Fong et al. | |
| 3,710,462 A | | 1/1973 | Robinson | |
| 3,809,589 A | * | 5/1974 | Kerstetter et al. | 156/68 |
| 4,381,655 A | | 5/1983 | Trutschel | |
| 4,413,997 A | | 11/1983 | Milligan et al. | |
| 4,415,611 A | | 11/1983 | Yamaqata et al. | |
| 4,513,042 A | | 4/1985 | Lumb | |
| 4,636,222 A | | 1/1987 | Pfleiderer et al. | |
| 4,773,135 A | | 9/1988 | Sato et al. | |
| 4,988,551 A | | 1/1991 | Zegler | |
| 5,376,145 A | | 12/1994 | Brady et al. | |
| 5,379,498 A | | 1/1995 | Nielsen et al. | |
| 5,392,499 A | | 2/1995 | Bertoldo | |
| 5,491,857 A | | 2/1996 | Love, III et al. | |
| 5,499,433 A | | 3/1996 | Moghaddassi et al. | |
| 5,553,364 A | | 9/1996 | Nakagawa | |
| 5,566,433 A | | 10/1996 | Love, III et al. | |
| 5,609,935 A | | 3/1997 | Yamagata et al. | |
| 5,645,892 A | | 7/1997 | Whitley et al. | |
| 5,780,107 A | | 7/1998 | Carr et al. | |
| 5,893,933 A | | 4/1999 | Strahm | |
| 5,943,746 A | | 8/1999 | Schramayr et al. | |
| 5,966,785 A | | 10/1999 | Catallo | |
| 5,980,579 A | | 11/1999 | Yoon | |
| 6,035,749 A | | 3/2000 | Haselwander | |
| 6,055,709 A | | 5/2000 | Martek et al. | |
| 6,112,381 A | | 9/2000 | Dischler et al. | |
| 6,195,854 B1 | | 3/2001 | Catallo | |
| 6,247,215 B1 | | 6/2001 | Van Alboom et al. | |
| 6,258,129 B1 | | 7/2001 | Dybdal et al. | |
| 6,260,247 B1 | | 7/2001 | Dischler et al. | |
| 6,269,525 B2 | | 8/2001 | Dischler et al. | |
| 6,330,786 B1 | | 12/2001 | Settle | |
| 6,375,685 B2 | | 4/2002 | Payet | |
| 6,634,070 B2 | | 10/2003 | Willauer, Jr. | |
| 6,722,000 B1 | | 4/2004 | Weiner et al. | |
| 6,823,569 B2 | | 11/2004 | Cohen et al. | |
| 6,916,349 B2 | | 7/2005 | Dischler et al. | |
| 6,941,623 B2 | | 9/2005 | Brorens et al. | |
| 7,090,701 B2 | | 8/2006 | Cardamone et al. | |
| 7,213,309 B2 | | 5/2007 | Wang et al. | |
| 7,763,324 B2 | | 7/2010 | Fratini et al. | |
| 2002/0016134 A1 | | 2/2002 | Horie | |
| 2004/0214027 A1 | | 10/2004 | Ko | |
| 2006/0225226 A1 | | 10/2006 | Merikoski | |
| 2008/0028582 A1 | | 2/2008 | Lee et al. | |
| 2008/0301920 A1 | | 12/2008 | Chadha | |
| 2008/0302837 A1 | | 12/2008 | Mitsui | |
| 2010/0159771 A1 | | 6/2010 | Fujisawa et al. | |
| 2010/0192338 A1 | | 8/2010 | Tukek | |
| 2012/0263911 A1 | | 10/2012 | Tao et al. | |

FOREIGN PATENT DOCUMENTS

| | | |
|---|---|---|
| CN | 101374993 A | 2/2009 |
| CN | 201389997 Y | 1/2010 |
| CN | 101979760 B | 5/2012 |
| JP | 08337950 A | 12/1996 |
| KR | 20-0304205 | 2/2003 |

OTHER PUBLICATIONS

Xiaoguang MA, China Textile & Apparel Press, "Physical and Mechanical Dyeing and Finishing of Textiles", 1st Edition, pp. 219-226, dated Jun. 30, 2002 and English translation.

* cited by examiner

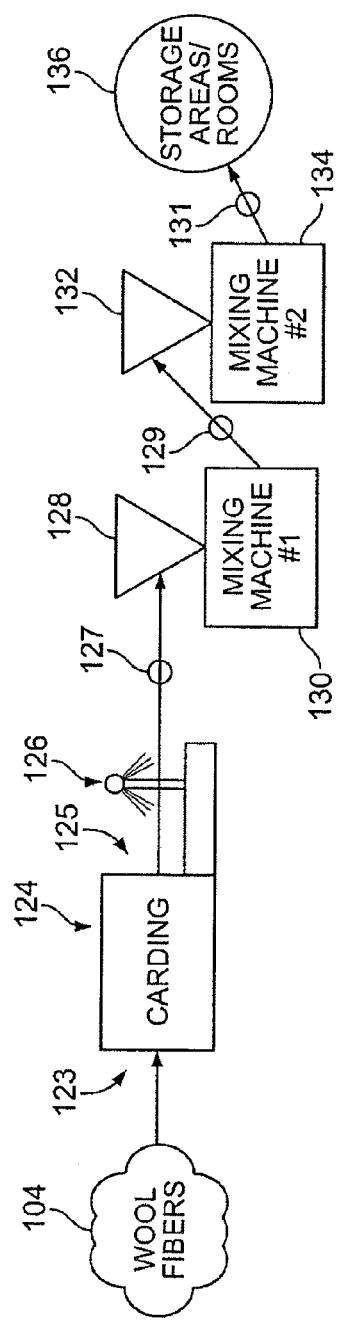
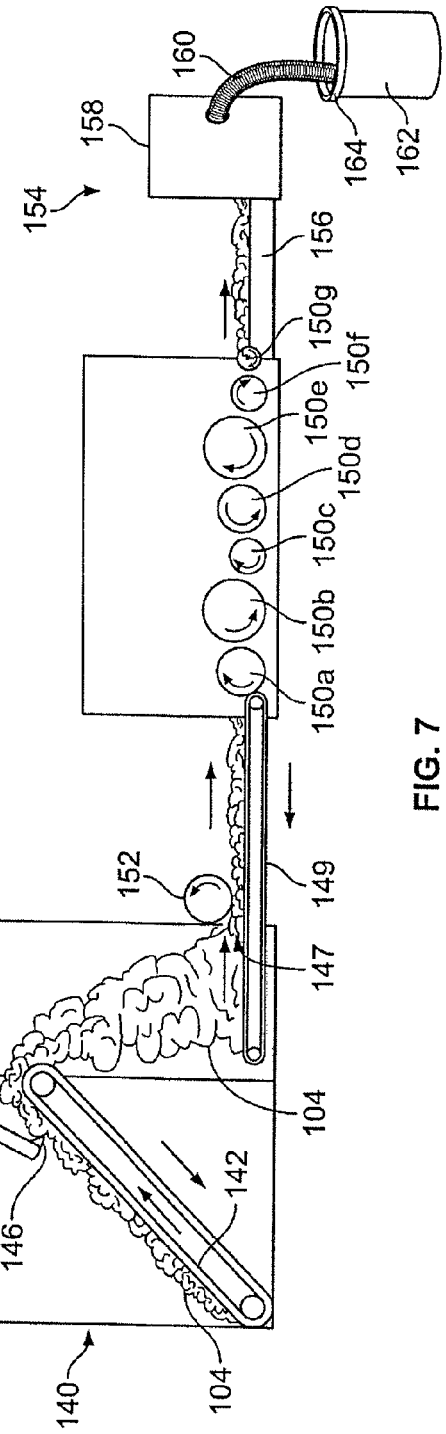
FIG. 6
FIG. 7

NATURAL WOOL PILE FABRIC AND METHOD FOR MAKING WOOL PILE FABRIC

PRIORITY CLAIM

The present non-provisional application claims priority to and the benefit of U.S. Provisional Application No. 61/618,470 filed on Mar. 30, 2012, U.S. Provisional Application No. 61/651,922 filed on May 25, 2012, U.S. Provisional Application No. 61/680,608 filed on Aug. 7, 2012 and U.S. Provisional Application No. 61/722,994 filed on Nov. 6, 2012, each of which are hereby incorporated by reference in their entireties.

BACKGROUND

Sheepskin is a by-product of the meat (lamb) industry. After slaughter, sheepskin is processed including tanning, cleaning, dying and conditioning. Sheepskin can be processed for use as leather only, or can be processed with the wool attached. The term "shearling" as used herein refers to sheepskin with the wool still on, which has been treated on both the skin or leather side and the wool or fleece side. Higher grades of shearling having acceptable quality on both the wool side and the skin side are called "twin-face" sheepskin. Shearling that has an acceptable wool side but an imperfect skin side is referred to as "table grade" sheepskin. The terms "natural fleece" and "fleece" as used herein refers to the natural wool of a sheep, either sheared from the sheep or the wool side of shearling, as distinguished from "polar fleece," which is a soft napped synthetic fabric.

Shearling is used in a variety of products including footwear, outwear, e.g., coats, gloves and hats, rugs, throws, pillows and car seat covers. It is an excellent insulator and yet breathes naturally. Natural wool fleece is soft, wicks moisture and provides for air circulation.

The cost associated with natural sheepskin products depends on the quality and the availability of sheepskin. Sheepskin quality varies considerably depending on many factors, including environmental factors. Accordingly, sheepskin is graded based on whether the sheepskin is a higher quality, i.e., little to no imperfections in the leather, or a lower quality, i.e., having many imperfections. Shearling quality and price is also impacted by the types of sheep that the shearling comes from. Certain types of sheep are more desirable because they produce better quality skins and/or softer fleece. Also, the number of the quality sheepskins available to manufacture the above products is limited by the number of sheep that are available. As demand for shearling and natural fleece products grows, the cost associated therewith also grows.

Accordingly, there is a need for an alternative to shearling that replicates the desirable qualities of sheepskin, increases supply, and reduces the associated costs.

SUMMARY

The present disclosure is directed to a sheared wool, natural fleece, deep pile fabric that closely resembles and can be used in lieu of shearling to make a variety of products including but not limited to footwear and apparel products. In very general terms, the present method involves forming a natural wool, deep pile fabric, and then finishing the fabric as if the fabric was natural sheepskin. Wool pile fabrics are known, but are generally unsuitable for use in clothing and footwear because the wool pile is coarse, bristly and abrasive. Accordingly, prior efforts to make artificial fur and shearling products have utilized softer artificial fibers, rather than natural wool fibers. See, e.g., U.S. Pat. Nos. 2,737,702, 3,710,462, 4,415,611 and 4,773,135 which are incorporated herein by reference. However, these artificial fur and fleece products lack the qualities of genuine, natural wool fleece and shearling. The inventors of the present disclosure have developed finishing processes that remarkably achieve a natural wool, deep pile fabric that very closely approximates natural wool fleece and shearling. The fabric is soft, dense and exhibits the same performance characteristics of natural sheepskin fleece.

In an embodiment, the present method of making a natural wool pile fabric includes providing wool slivers comprised of sheared wool fibers; knitting or weaving the wool fibers with a yarn to form a length of pile fabric having a textile scrim on one side and wool pile on the other side, rough shearing the wool side of the fabric to a first predetermined length of the wool fibers, applying a polishing agent to the wool fleece side of the web, polishing the wool fleece side by passing the web through at least two sets of heated rollers, where each set has at least two rollers, and fine shearing of the wool fleece side of the web to a second predetermined length of the wool fibers.

In another embodiment, the present method of making a sheared wool, deep pile fabric that closely resembles natural sheepskin fleece includes forming a length of wool pile fabric having natural wool fibers on one side and a scrim on an opposing side and finishing the wool pile fabric as natural shearling. The finishing process includes polishing the wool fiber side of the pile fabric by guiding the length of pile fabric over one or more heated first polishing rolls, applying a sheepskin conditioning solution to the wool fiber side of the pile fabric, further polishing the wool fiber side of the pile fabric by guiding the fabric a plurality of times over one or more second heated polishing rolls, and cutting the wool fibers to a designated length.

In a further embodiment, a method of making a sheared wool pile fabric includes combining wool fibers with a yarn to form a length of wool pile fabric having a textile scrim on one side and wool fiber pile on an opposing side. Several finishing steps are performed on the fabric including rough shearing the wool fiber side of the web to a first predetermined length of the wool fibers, applying a polishing coating to the wool fiber side of the fabric, polishing the wool fiber side by passing the web over at least two heated rolls and fine shearing the wool fiber side of the web to a second predetermined length of the wool fibers.

In another embodiment, the present method of making a wool fleece product includes providing wool top comprised of sheared wool fibers and weaving the wool fibers with a yarn to form a semi-finished wool fleece web having a textile scrim on one side and wool fleece on an opposing side. Further processing steps are performed on the web including rough shearing the wool fleece side of the web to a first length of the wool fibers, polishing the wool fleece side by passing the web through a first set of at least two rolls heated to at least 240 degrees C. and applying a polishing coating to the wool fleece side of the web. To further enhance the softness and shininess of the web, additional processing steps are performed and include polishing the wool fleece side by passing the web through a second set of at least two rolls heated to at least 235 degrees C., shearing the wool fleece side of the web to a second wool fiber length, wherein the second wool fiber length is less than the first wool fiber length, polishing the wool fleece side by passing the web through a third set of at least two rolls heated to at least 225 degrees C., further polishing the wool fleece side of the web with at least one additional roll heated to temperature of 215 degrees C., and shearing the wool fleece side of the web to a final wool fiber length, wherein the final wool fiber length is less than the second wool fiber length.

BRIEF DESCRIPTION OF THE DRAWINGS

FIG. 6 is a schematic diagram showing an embodiment of an initial carding and wool fiber mixing process.

FIG. 7 is a schematic diagram showing an embodiment of a carding and slivering machine.

DETAILED DESCRIPTION

Various embodiments of the invention are described below by way of example only, with reference to the accompanying drawings. The drawings include schematic figures that may not be to scale, which will be fully understood by skilled artisans with reference to the accompanying description. Features may be exaggerated for purposes of illustration. From the preferred embodiments, artisans will recognize additional features and broader aspects of the invention.

The present disclosure is directed to a method of processing sheared wool, securing it to a textile scrim, and finishing the same to make a sheared wool, natural fleece, deep pile fabric that can be used in lieu of shearling in making footwear, apparel and other products. The wool pile fabric formed by the process of the present invention closely approximates shearling and can be used in lieu of shearling in many applications. In one application, the wool pile fabric is used to make artificial shearling for use as a liner for footwear, coats, gloves and other products in lieu of natural shearling.

Figure 2:
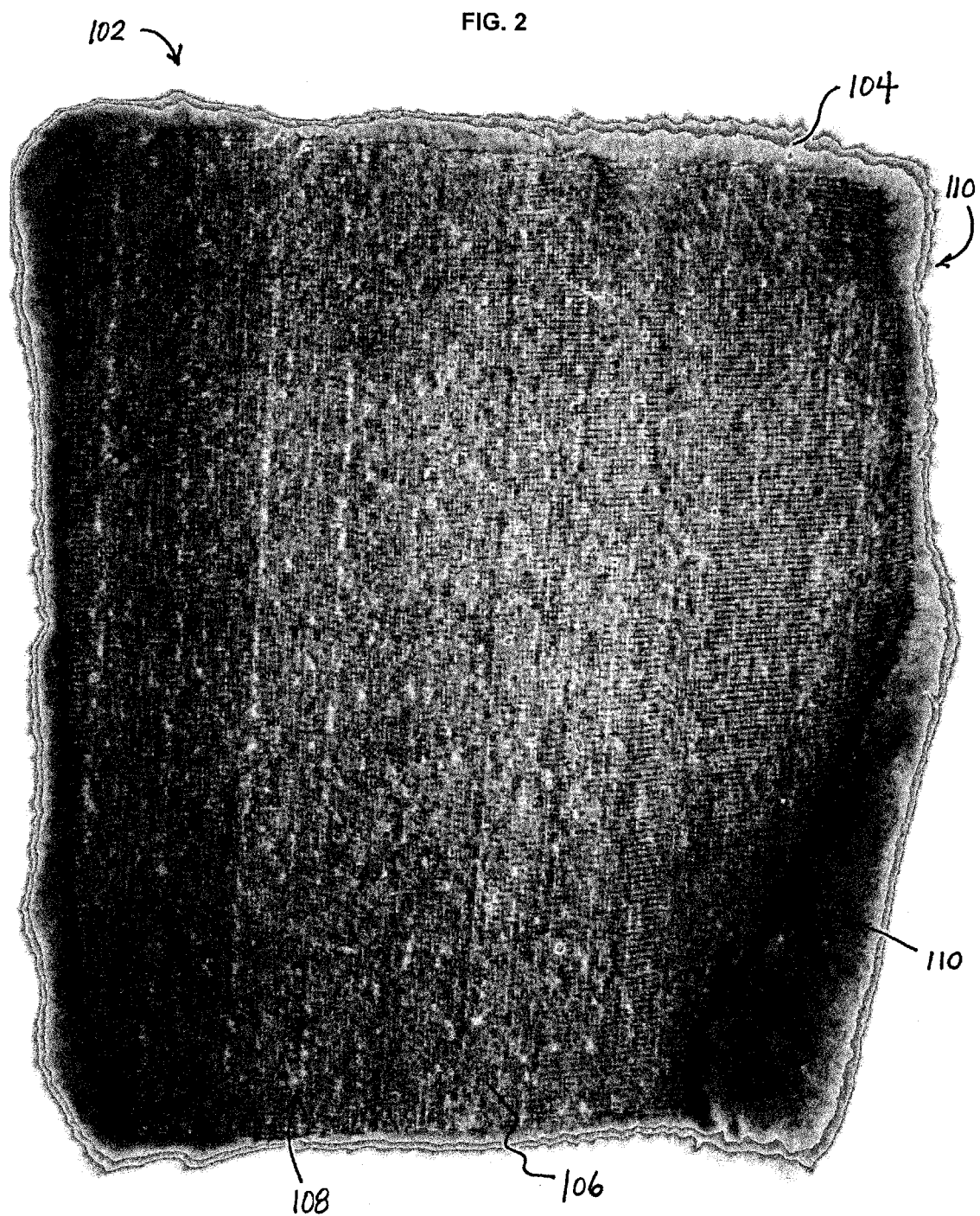
FIG. 2 is a photograph of an embodiment of the wool pile fabric of the present invention.
Figure 3A:
FIG. 3A is a photograph of a wool side of a second embodiment of a wool pile product of the present invention.
Figure 3B:
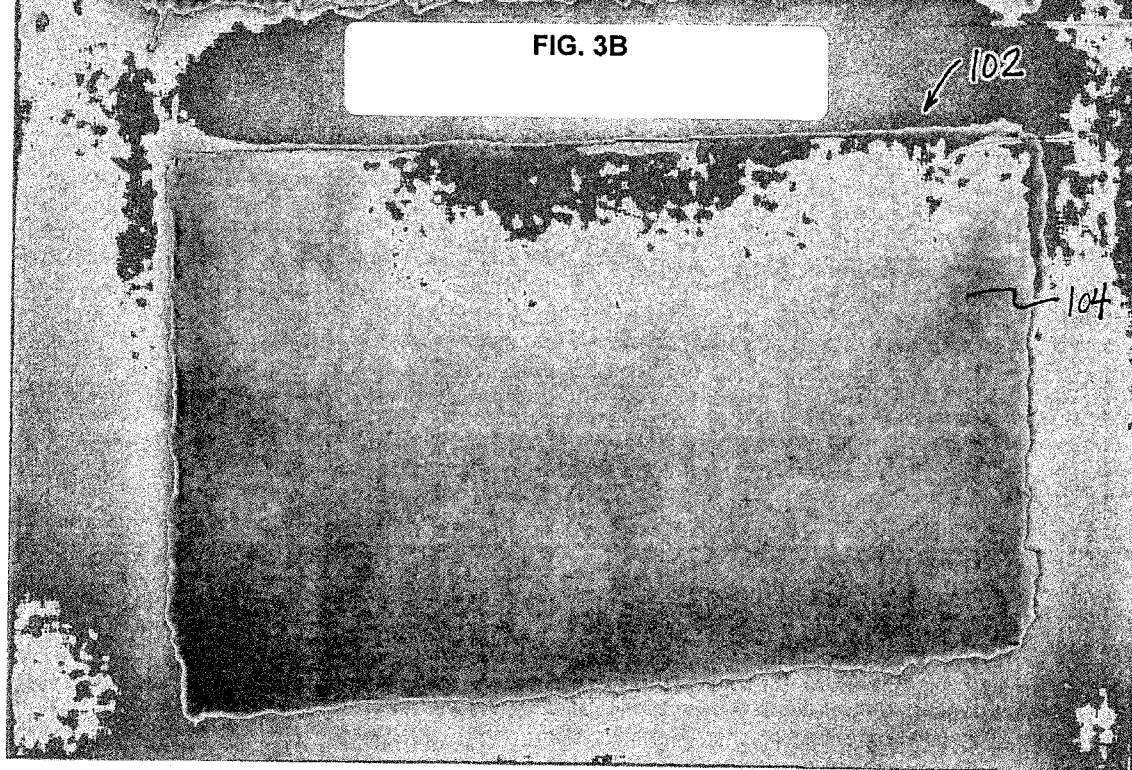
FIG. 3B is a photograph of the other side of the second embodiment product.
Figure 4:
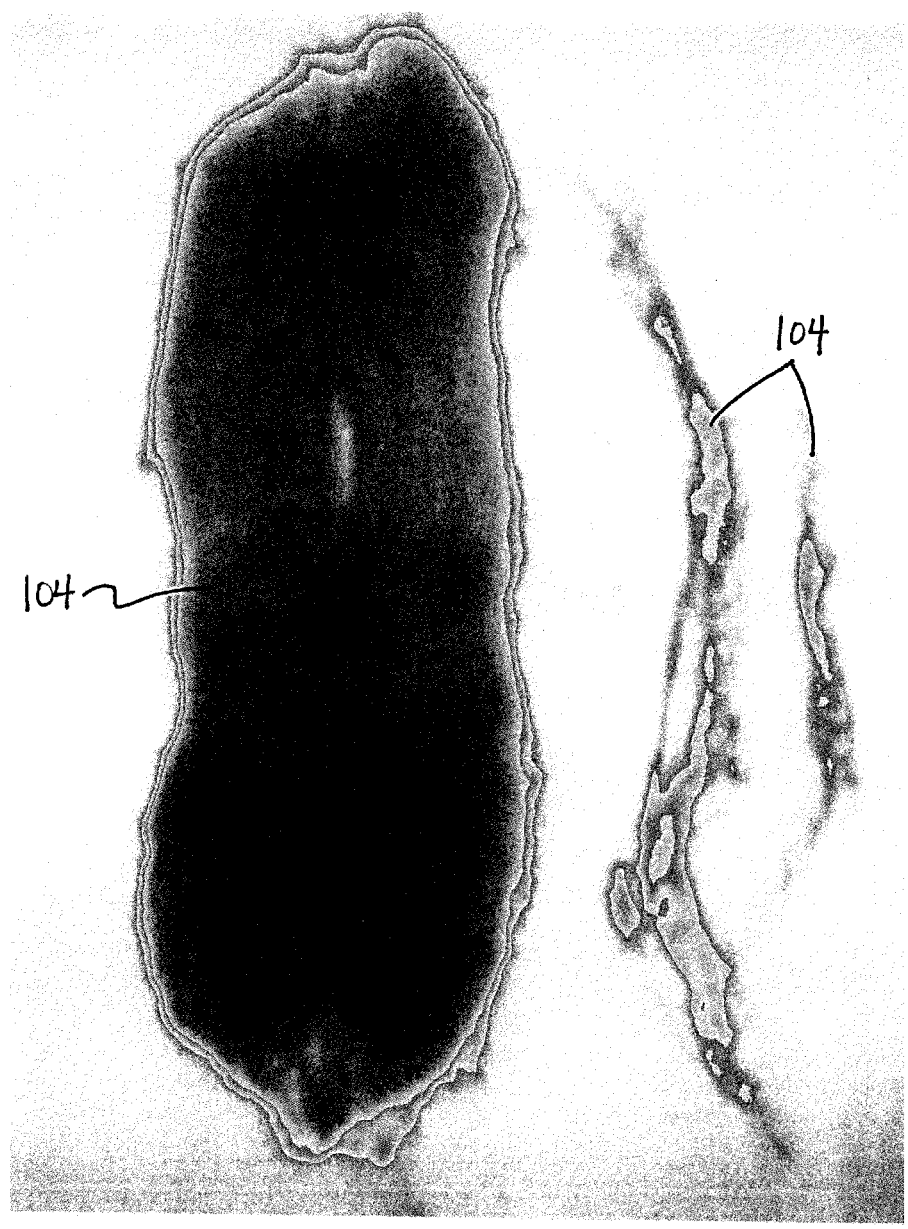
FIG. 4 are photographs of wool fibers.

Referring to FIGS. 1-31, the present method for making the wool pile fabric includes the following processes: a raw material finishing process 100, a knitting process 200, an inspection process 300, a pre-finishing process 400, a finishing process 500, a post-finishing process 600 and a storage/shipping process 700 for producing the wool pile fabric 102. Examples of the finished wool pile fabric 102 are shown in FIGS. 2 and 3.

Figure 5:
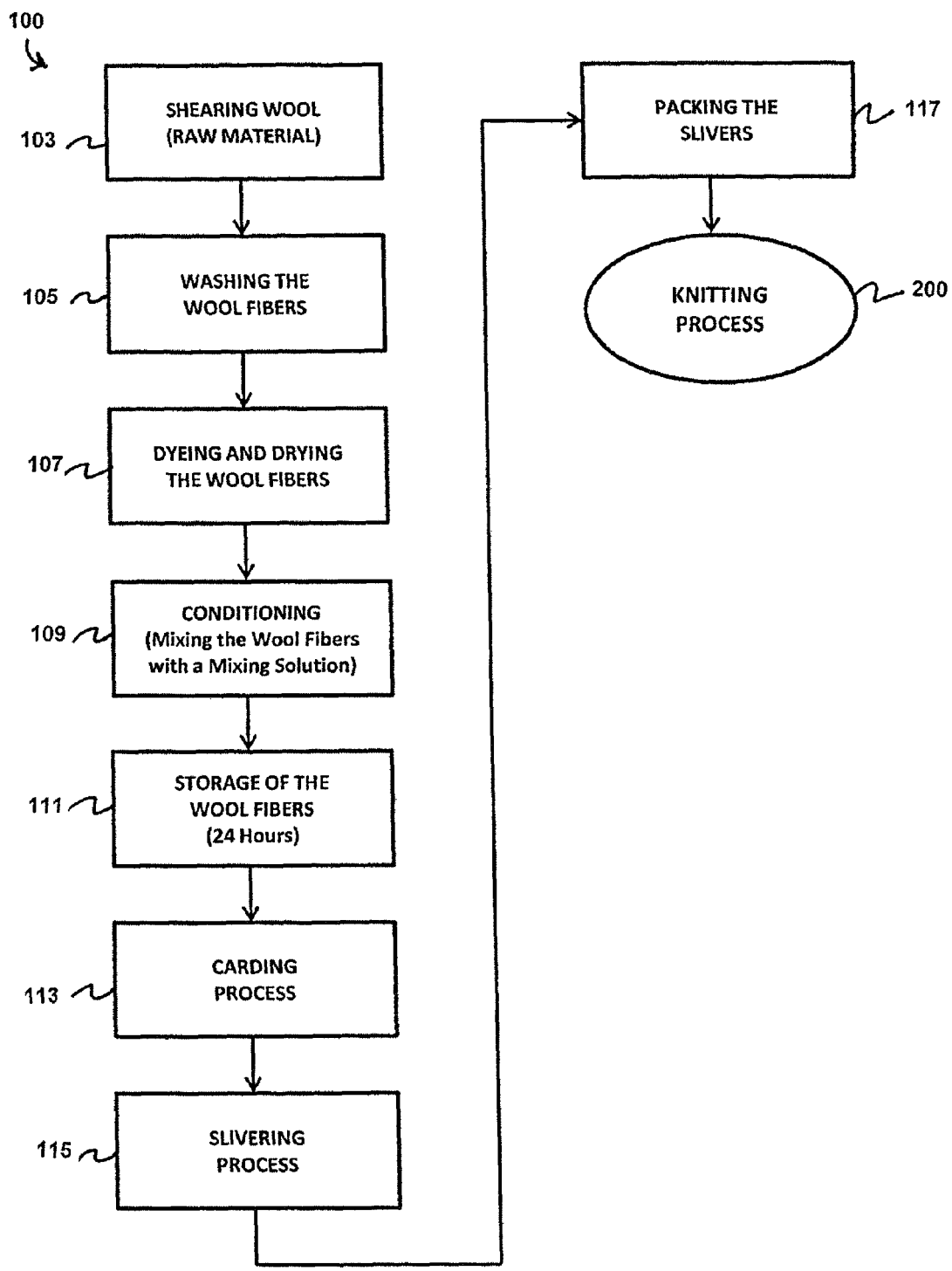
FIG. 5 is a block diagram showing a raw material processing process.

In the raw material finishing process 100 illustrated in FIG. 5, natural wool is sheared from live sheep or from sheepskins or pelts in a shearing step 103 to provide wool fibers 104. The wool fibers 104 are the natural fibers from sheep that comprise wool used in manufacturing the wool pile fabric 102. Initially, the wool fibers are cleaned in a washing step 105 to remove impurities such as oils from the sheep's skin, dirt and odor. Specifically, the wool fibers 104 are placed in a cleaning machine that washes the wool fibers using water and suitable cleaning solutions. After being cleaned, the wool fibers 104 (FIG. 4) are ready for further processing as described below. Alternatively, cleaned wool fibers 104 can be stored in one or more suitable containers, such as a sealed bag or bags, for immediate processing, storage or shipment to another location for processing at a later time.

As shown in FIG. 5, the cleaned wool fibers 104 are dyed and dried 107 to change the color of the wool fibers from a non-uniform mix of gray, white and brown colors to a uniform off-white or parchment color that is common in natural fleece products. It should be appreciated that the wool fibers 104 may be dyed to any desired color or combination of colors, including but not limited to, a natural fleece color, blue, gray, white, pink and purple. In the dyeing process, a designated amount of the cleaned wool fibers 104 is placed in a dye vat based on the vat size. Specifically, 400-430 kg of the wool fibers and 3.5-4.0 tons of water (at about 68 to 72° C. for lighter color dyes and about 78 to 82° C. for darker color dyes) are added to the dye vat to fully load the vat and soak the wool fibers. The vat is sealed and the wool fibers 104 are soaked for a designated period of time. The water is then drained from the vat and hot water is supplied to the vat based on the amount of the wool fibers placed in the vat. The water in the vat is then heated to a designated temperature, which in this embodiment is about 70° C. While the water is being heated, a designated amount of ammonia and a softening agent proportional to the amount of water in the dye tank are mixed in a separate stirring tank and a designated amount of water is extracted to melt the dye as described below. In the present method, a ratio of approximately 10 kg of ammonia and 4 kg of the softening agent are mixed with 250 L of water. When the water in the dye vat reaches the designated temperature, the mixture of ammonia and the softening agent are supplied to the vat via an inlet line connected to a suitable pump.

The wool fibers 104 soak in the mixture of water, ammonia and softening agent for at least thirty minutes before the dye is added. During the soaking period, the extracted water is heated to 100° C. and mixed with the dye to melt the dye. After the thirty minute soaking period, a dye of a selected color, such as natural fleece is added to the vat via an inlet line connected to a pump. The dye mixture and the wool fibers in the vat are agitated for about ninety minutes and then a formic acid solution is added to the vat via the inlet line and pump. Initially, 3 kg of the formic acid solution is added to the vat. After fifteen minutes, an additional 3 kg of the formic acid solution is added to the vat to achieve a ratio of 1:8 formic acid solution to water and the mixture is further agitated for a designated amount of time.

When the dyeing of the wool fibers 104 is completed, the mixing solution is drained from the vat leaving the dyed wool fibers. The vat is then filled with a washing solution including a mixture of water, formic acid and softening agent for washing the fibers. In this embodiment, approximately 2 kg of formic acid and 10 kg of softening agent are added for every 400 kg of the wool fibers in the vat. After washing the wool fibers in the vat, the washing solution is drained and the dyed wool fibers 104 are removed from the vat and inserted into a dehydrator. The dehydrator includes a tank having a screen-type bowl rotatably connected to the tank. The bowl operates similar to a spin cycle of a washing machine where the bowl rotates the wool fibers at a designated number of revolutions per minute (rpm) to remove excess water from the wool fibers. The excess water exits the dehydrator via a drain line attached to the tank. The dehydrated wool fibers are then transported to one or more dryers to dry the wool fibers 104. In the present embodiment, each dryer includes a first stage having three ovens set at an operating temperature of 130° C., a second stage having two ovens set at an operating temperature of at least 130° C. and a third stage having a cooler oven set at a lower operating temperature that the other ovens to cool the wool fibers. The dried wool fibers exit the dryer or dyers and are wrapped in a bundle by a fabric material using one or more baling machines. Each bundle of the wool fibers 104 weighs approximately 50 kg. It should be appreciated that a colorfast treatment solution may be applied to the wool fibers 104 after being dyed to help preserve or maintain the dyed color. It should also be appreciated that other equipment and processes can alternatively be used for dying the wool fiber consistent with this disclosure.

Referring now to FIGS. 5 and 6, after the dyeing and drying step 107, the wool fibers 104 are conditioned 109 in which a carding-applicator machine 124 untangles and aligns the wool fibers 104. A conditioning solution is applied including a lubricant and an anti-static agent to the fibers. The wool fibers 104 are subsequently mixed together in two mixers or mixing machines 130 and 134 connected in series to evenly distribute the conditioning solution on the wool fibers. The conditioning solution enables the wool fibers 104 to be easily separated and used in subsequent processing steps.

Initially, as described above, a designated batch or batches of the wool fibers 104 are received following the dyeing process 107 (FIG. 5). The batch size or weight of each batch is based on production parameters (i.e., the length, width and thickness of the finished wool pile fabric 102) and wool blend needed to produce the wool pile fabric. Each batch of wool fibers 104 is unwrapped or opened and placed on a metal pan or other suitable surface near an inlet side 123 of the carding-applicator machine 124. The wool fibers 104 are then manually placed onto an inlet conveyor belt on a first or inlet side of the carding-applicator machine 124 which moves wool fibers 104 toward a pivoting carding arm having metal teeth. The carding arm reciprocates between a non-engaged position and an engaged, carding position in which the carding arm, and more specifically, the teeth on the carding arm contact the wool fibers in a generally parallel direction to the movement of the wool fibers to untangle, clean, intermix and align the wool fibers so that the conditioning solution is applied to a significant percentage of the wool fibers prior to entering the first mixing machine.

The conditioning solution is applied with a sprayer assembly 126, which is connected to an outlet side 125 of carding-applicator machine 124. Sprayer assembly 126 preferably includes five sprayers connected to a supply line, which in turn, is connected via suitable tubing to one or more containers including conditioning solution. A valve is connected to an inlet to the supply line to control the flow rate of the conditioning solution to the supply line. After being carded, wool fibers 104 are transported under the sprayers of sprayer assembly 126 via an outlet conveyor belt. The sprayers uniformly apply the conditioning solution to wool fibers 104 as the fibers move underneath the sprayers.

After the conditioning solution is applied to the fibers, the coated wool fibers 104 are transported to a first hopper 128 associated with the first mixing machine by suitable tubing or piping having an in line blower 127 which generates a vacuum in the tubing attached between blower 127 and the outlet side 125 of carding-applicator machine 124 to suction wool fibers 104 into the tubing and forcefully blows air through tubing attached between blower 127 and the first hopper 128 to transport the coated wool fibers to the first hopper.

In the present embodiment, the mixing solution includes twenty percent (20%) mineral oil (lubricant), twenty percent (20%) of anti-static agent and sixty percent (60%) water. Other mixing solutions are contemplated and can be use in lieu of this embodiment. Preferably, about 5 kg of the mixing solution is applied to 100 kg of the wool fibers. The ratio of the mixing solution applied to the wool fibers may be adjusted as needed.

The coated wool fibers 104 in the first hopper 128 are gravity fed to first mixing machine 130. More specifically, first mixing machine 130 includes a rotating drum that receives coated wool fibers 104 from first hopper 128 and rotates at a designated rate to ensure that the wool fibers are evenly coated with the conditioning solution. The first mixing machine 130 operates for a designated period of time based on prior mixing times for mixing coated wool fibers 104. After the mixing is finished in first mixing machine 130, the wool fibers 104 are transported to a second mixing machine 134 via tubing connected between a second hopper 132 associated with the second mixing machine and an outlet of first mixing machine 130. A second blower 129 is connected in line with the tubing to generate a vacuum in the tubing between second blower 129 and the outlet of first mixing machine 130 and forcefully blows air through the tubing connected between second hopper 132 and the second blower to transport the coated wool fibers from first mixing machine 130 to second hopper 132 as described above.

The second hopper 132 gravity feeds coated wool fibers 104 into second mixing machine 134, and more specifically, into a rotating second drum of the second mixing machine to further mix the coated wool fibers. Second mixing machine 134 operates for a designated period of time to further distribute the conditioning solution on wool fibers 104. In the present method, the first and second mixing machines 130, 134 are substantially the same mixing machines. It should be appreciated that one or a plurality of mixing machines may be connected in series to mix the coated wool fibers. It should also be appreciated that the mixing machines 130, 134 may be the same or different mixing machines.

After the mixing process is finished, the wool fibers 104 are transported to one of a plurality of storage areas or storage rooms 136 via tubes connected to an inline blower 131 (FIG. 6). More specifically, a first end of each tube is connected to and extends partially through a top wall of a different one of the storage rooms 136 and an opposing second end of each tube is connected to blower 131. The blower 131 generates a vacuum at the outlet of the second mixing machine 132 to suction the wool fibers 104 from the outlet of the second mixing machine and toward an inlet of the blower 131. The wool fibers 104 pass through blower 131 and into one or more of the tubes connected to an outlet of the blower. One or more of the outlet tubes may be closed by adjustable baffles positioned inside of and movably connected to each of the tubes so that one or more of the tubes may be closed during operation to control the movement of wool fibers 104 through the tubes and into one or more of the storage areas/storage rooms 136. As shown in storage step 113, the wool fibers 104 remain in one or more of the storage areas 136 for at least twenty-four hours to allow the conditioning solution to dry and set on the wool fibers. It should be appreciated that the storage time may be adjusted to longer or shorter periods depending on the batch size and amount of the mixing solution applied to the fibers. For example, smaller batch sizes require less storage time for the solution to dry and set.

Next, wool fibers 104 are carded 113 and slivered 115 for further processing. As stated above, carding is a process that untangles and aligns the wool fibers to be generally parallel to each other in a flat sheet called a web. The web is then formed into narrow ropes known as slivers as further described below. The carding step 113 also removes any residual dirt and other foreign material and matter remaining on the wool fibers 104.

The carding and slivering process described above may be performed by one or more machines that untangle and align fibers and form the fibers into slivers. In the present embodiment, a combined carding and slivering machine 138 (hereinafter referred to as a "CS machine") is used to perform the above steps. It should be appreciated that one or a plurality of the CS machines 138 may be utilized in the present method. After the wool fibers 104 are stored in one or more of the storage rooms 136 for at least twenty-four hours (or a lesser time for smaller amounts of the wool fibers), wool fibers 104 are manually fed into one or more of the CS machines 138. In a carding portion of each of the CS machines 138, an inlet 140 of each CS machine includes an inlet conveyor belt 142 that moves or transports wool fibers 104 toward a pivoting carding arm 144 having a series of metal teeth 146 similar to the carding arm discussed above. Each of the carding arms 144 reciprocate between a non-engaged position and an engaged, carding position in which the carding arm, and more specifically, the teeth 146 on the carding arm contact the wool fibers 104 and untangle, clean, intermix and align the wool fibers.

After passing the pivoting carding arm 144 in each of the CS machines 138, the carded wool fibers 104 fall off of the end of the inlet conveyor 142 and into an internal hopper 148, which gravity feeds the wool fibers 104 toward an elongated, horizontal opening 147 at the bottom of the internal hopper. A hopper conveyor belt 149 positioned at the bottom of the internal hopper 148 extends between the bottom of the internal hopper, through the hopper opening 147 and to a first carding roller 150a of a series of carding rollers 150a to 150g. A packing roller 152 is movably connected to each of the CS machines 138 adjacent to the internal hopper opening 147 as shown in FIG. 7 and rotates counterclockwise to pack the wool fibers 104 together and form a continuous wool fiber web. The web moves through the series of carding rollers 150a to 150g. Each of the carding rollers 150 is covered by a carding material including a plurality of teeth that comb or rake the fibers in the web to further untangle (i.e., break up clumps and knots in the wool fibers) and align the fibers as well as remove any remaining debris that may reside in the fiber web. The carding material is preferably made from a sturdy flexible scrim in which the teeth are closely spaced and embedded in the scrim. It should be appreciated that each CS machine 138 may include one or more carding rollers 150 and the carding rollers may have the same or a different number of teeth. Preferably, the teeth on each of the carding rollers 150 are made of metal but may be made out of other suitable materials or combination of materials.

The continuous wool fiber web exits from the series of carding rollers 150 and enters a slivering portion 154 of the CS machine. In slivering portion 154, the wool fiber web moves between two converging walls 156 that direct the web into a slivering mechanism 158. Each of the slivering mechanisms 158 form the web into continuous strands or "slivers" 160 of the wool fibers 104 for subsequent knitting of the wool fibers as described below. Hereinafter, the terms "sliver" or "wool sliver" refers to a tubular material formed predominately from the wool fibers 104 but may also include other natural or artificial fibers. In this embodiment, the slivers have a weight of 17 g/m. It should be appreciated that the weight of the slivers 160 is preferably in the range of about 16.5 to 17.5 g/m, but other suitable weights are contemplated.

After exiting the slivering mechanism 158, the wool fiber slivers 160 are directed into a container or canister 162 in packing step 117. Each of the containers 162 is lined with a packing bag 164 made of nylon or other suitable material. The containers 164 are placed in one of a plurality of container positions or slots in a packing area in the slivering portion 154 and separated by arms where the arms are rotatably connected to the CS machine 138. When a container 162, and more specifically, the bag 164 inside the container is completely filled with a continuous wool fiber sliver 160, the sliver is manually cut and the arms are rotated either manually or automatically, to move the filled container away from the slivering mechanism 158 and simultaneously move an empty container 162 into position to be filled by the next continuous wool fiber web. The arms also help to hold the containers in position relative to the slivering mechanism 158 during operation.

As stated above, when a container 162 is filled with a wool fiber sliver 160, the container is moved away from the slivering mechanism 158 and removed from the CS machine 138. Next, the packing bag 164 is removed from the container 162 and sealed by a drawstring attached to a top end of the packing bag or other suitable sealing device. Each of the filled packing bags 164 is weighed and the weight and other pertinent information, such as the type and density of the wool blend of the sliver 160, is attached to or associated with the bag and recorded in a storage medium of a suitable processor such as a computer. Each packing bag 164 is then transferred to a storage area for subsequent processing. The empty containers 162 are each re-wrapped or re-lined with a new or empty packing bag 164 and moved back to a container position in the packing area of one or more of the CS machines 138.

The wool fiber slivers 160 are now secured to a base material, such as a textile scrim 106, in a fabric forming process 200, such as knitting. It should be appreciated that the term "scrim" used hereinafter refers to an underlying backing, framework or structure, including but not limited to, textiles. Furthermore, the terms "fabric" and "textile" as used herein refer to any type of cloth produced by knitting, weaving or non-woven textile processes. Although various fabric forming processes can be used consistent with this disclosure, knitting is a preferred process as described below.

In the knitting process 200, a scrim material, such as a polyester yarn, is simultaneously knitted with the wool fibers 104 from the wool fiber slivers 160 to create a durable, single jersey, circular knit pile fabric 166. Other types of scrim yarn can be used, including both natural fiber yarns, e.g., cotton, as well as synthetics, such as polyester.

Figure 8:
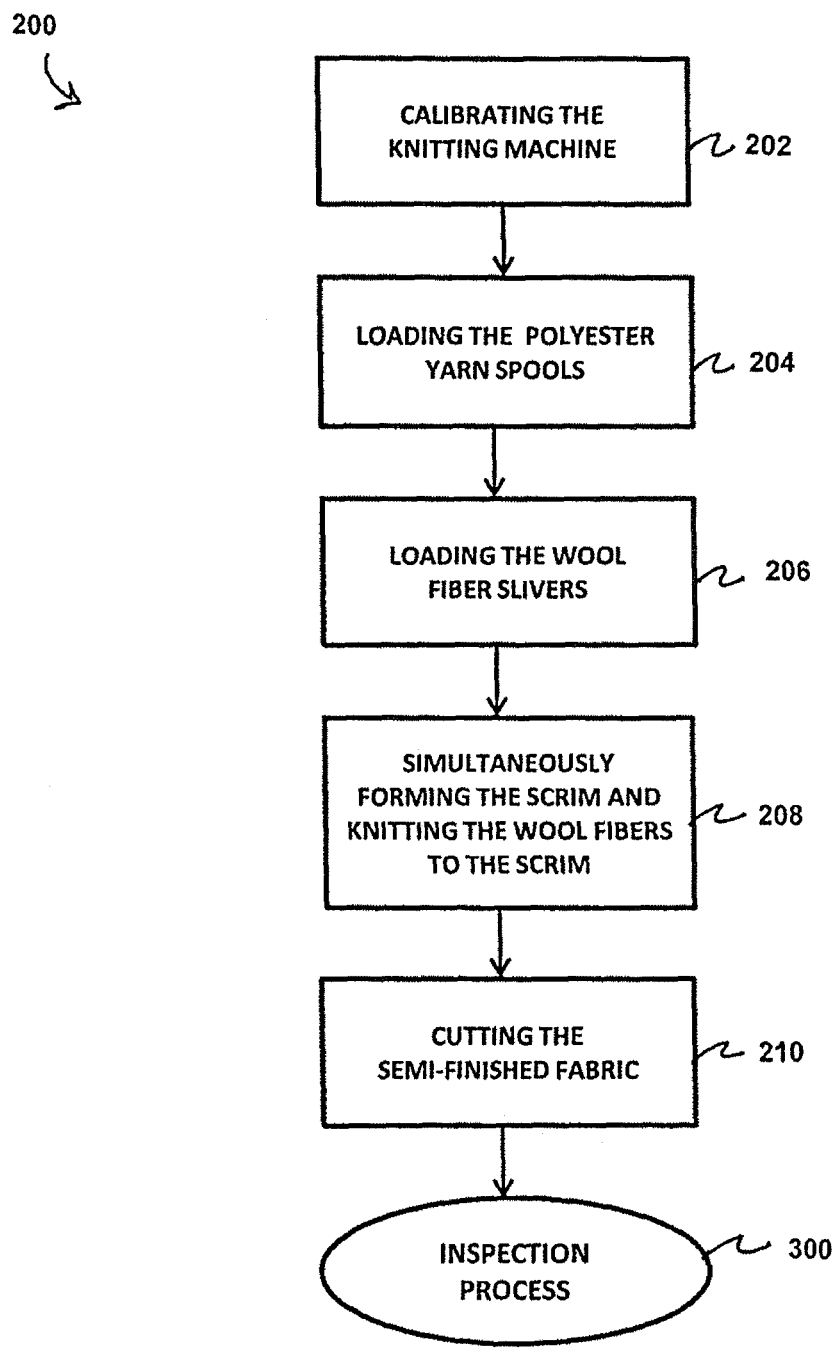
FIG. 8 is a block diagram showing a process for knitting the sheared wool fibers with a textile scrim.
Figure 9:
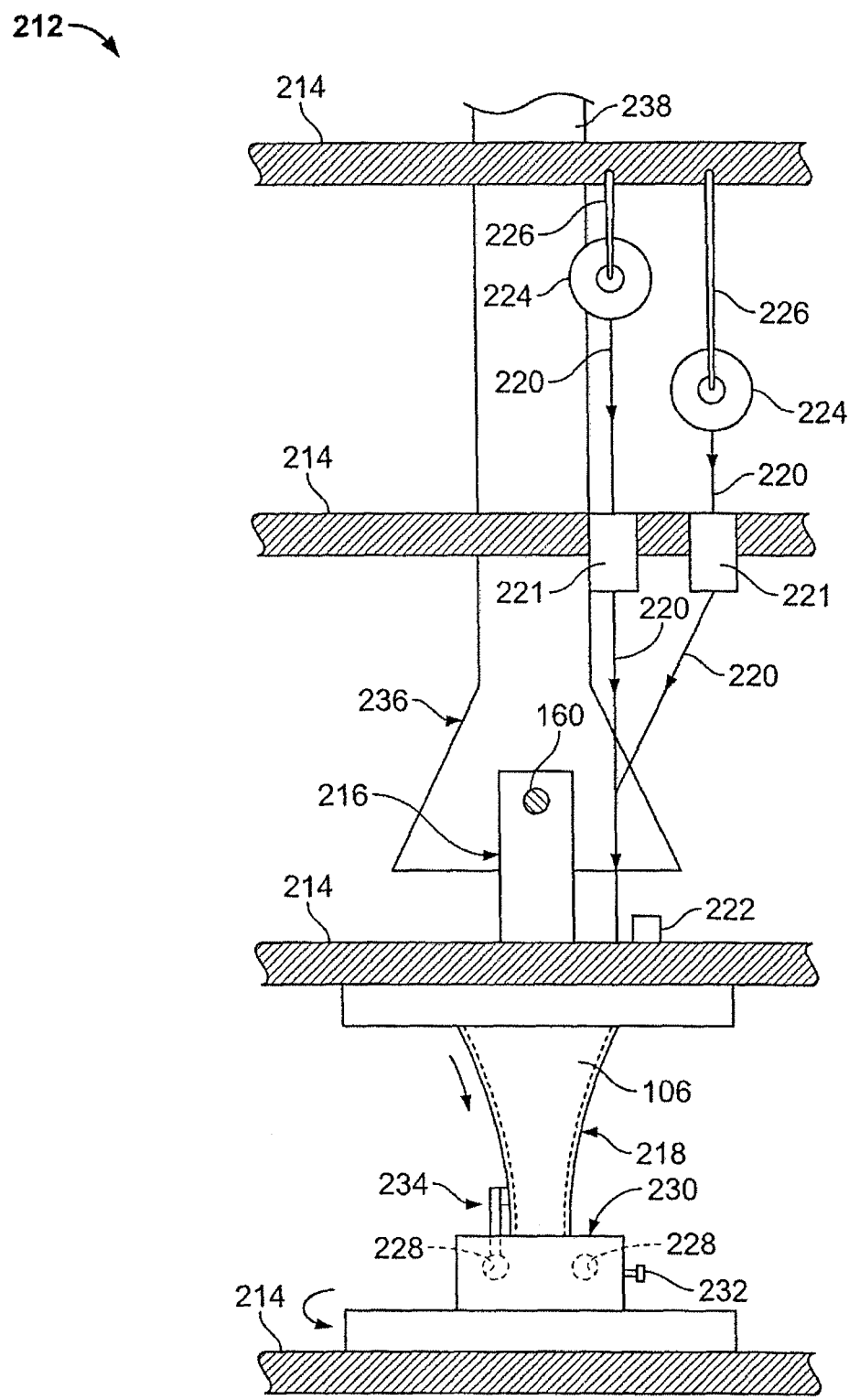
FIG. 9 is a fragmentary, cross-sectional view of a knitting machine

Referring now to FIGS. 8 and 9, a knitting machine 212 includes a frame 214 and a plurality of knitting heads or knitting feed devices 216 mounted to the frame for knitting wool fibers 104 of wool fiber slivers 160 with the polyester yarn to form a tubular knit semi-finished fabric 218. Initially, a calibration step 202 is performed where the tension and pattern for polyester yarn 220 and the sliver feeds of the knitting feed devices 216 are calibrated to ensure that the knitting machine 212 is within designated parameters and tolerances for knitting a particular fabric product. In an embodiment, the knitting devices 216 are calibrated to knit at a designated speed and a density of 2450 to 2550 g/linear meter. It should be appreciated that the knitting devices 216 of each knitting machine 212 may be calibrated to operate at other suitable speeds and densities.

The present method utilizes a plurality of knitting machines 212 where each of the knitting machines has a plurality knitting feed devices 216. It should be appreciated that the present method may employ one or a plurality of knitting machines 212 each having a suitable number of feed devices 216. Each feed device 216 of the knitting machines 212 is preferably configured to receive one of the wool fiber slivers 160 and two strands yarn 220 supplied by respective yarn spools 224 loaded on L-shaped support arms 226 connected to and extending from the frame 214 in loading step 204. It should be appreciated that the number of yarn spools 224 loaded on the machine depends on the size of the wool pile fabric 102. Specifically, the wool fiber slivers 160 are moved adjacent to and fed into the knitting feed devices 216 on each of the knitting machines 212 in the loading step 206. After both the yarn spool(s) 224 and the wool fiber sliver(s) 160 are loaded and fed into the knitting devices 216 and the yarn strands 220 are fed into corresponding yarn feeding devices 221, each of the knitting machines 212 is activated, i.e., turned "on," to start the knitting process.

During the knitting process 200, the strands forming the scrim 106 and the wool fibers 104 from the slivers 160 are simultaneously knit together in the knitting step 208 to produce a tubular knit semi-finished fabric 218, hereinafter referred to as a "semi-finished pile fabric." To ensure that wool fibers 104 are in proper position relative to the strands 220 to be knitted together by each of the knitting feed devices 216, a fiber blower 222 is associated with each of the knitting feed devices 216 and generates a stream of air directed at the wool fibers 104. The air stream from each fiber blower 222 also causes the wool fibers 104 in the semi-finished pile fabric 218 to be angled in a direction away from the blowers, which will be relevant in subsequent processing steps described in more detail below. It should be appreciated that scrim 106 may be made with any suitable material or combination of materials and is typically made with a fabric material. It should also be appreciated that other suitable yarning process, knitting process, weaving process or attachment process may be used to attach the wool fibers 104 to the scrim 106.

In the knitting process 200, the semi-finished pile fabric 218 is knitted until it reaches a designated length. At which time the semi-finished pile fabric 218 is inserted between a pair of support bars 228 that are rotatably connected to the frame 214 of the knitting machine 212. Specifically, the support bars 228 are connected at one end to a fixed mount 230 and at an opposing end to a motor (not shown) where the tension of the support bars is adjusted by manually turning a handle 232 connected to the fixed mount. The motor includes at least one drive roller that is rotated by the motor and contacts an inner surface of the knitting machine 212. The drive roller is preferably made of a suitable traction material, such as rubber, for gripping and rolling on the inner surface for rotating the support bars 228. The rotation of the support bars 228 similarly rotates so that the semi-finished pile fabric 218 is knit as a continuous tube as shown in FIG. 9.

In a cutting step 210, a knife or cutting blade 234 is fixedly positioned beneath the knitting feed devices 216 parallel to and in contact with the semi-finished tubular pile fabric 218 such that the cutting blade longitudinally cuts the semi-finished pile fabric as the fabric is being knit by the knitting feed devices 216. The knitting process 200 continues until the semi-finished pile fabric 218 reaches a designated length, which in the present embodiment, is a length of about 13 to 14 meters. Specifically, each knitting machine 216 includes a control panel and a display device in communication with the control panel. The designated length of the semi-finished pile fabric 218 is based on the number of revolutions of the support arms (or the semi-finished pile fabric). In the present method, the number of revolutions of the support arms is set at approximately 1500 revolutions to achieve a desired length of the semi-finished pile fabric of 13 to 14 meters. It should be appreciated that the semi-finished pile fabric 218 may be formed in other suitable lengths and that the number of revolutions of the support arms 228 may be set at another suitable number of revolutions to achieve a desired length of the semi-finished pile fabric 218. In the present method, the knitting machine 212 may be programmed to stop operation when the desired number of revolutions of the support arms 228 is reached. Alternatively, an operator watches a display device associated with the knitting machine 212 and stops operation of the knitting machine upon reaching the desired number of revolutions of the support arms 228. When the knitting process is finished, i.e., the designated number of revolutions of the support arms 228 is reached, the operator manually cuts the semi-finished pile fabric 218 transverse to the longitudinal axis of the product to separate the fabric from the knitting machine 212. The semi-finished pile fabric 218 is then manually pulled through an opening at the bottom of the knitting machine 212 to remove fabric 218 for subsequent processing. Alternatively, the knitting machine 212 is positioned on an elevated structure or floor such that the semi-finished pile fabric may be retrieved by an operator from below the knitting machine. In the present method, the above steps are performed multiple times by one or more knitting machines to produce a plurality of semi-finished pile fabrics pieces 218.

The knitting machine 212 also includes a suction vent 236 positioned on a side of the knitted fibers opposite to the knitting feed devices 216. Suction vent 236 is attached to an exhaust tube 238 having an in line blower that generates a vacuum or suction in the exhaust tube for removing any loose debris and fibers resulting from the knitting process. Exhaust tubes 238 from each of the knitting machines 212 are directed to a main exhaust duct (not shown) extending outside of the building containing the knitting machines.

Figure 10:
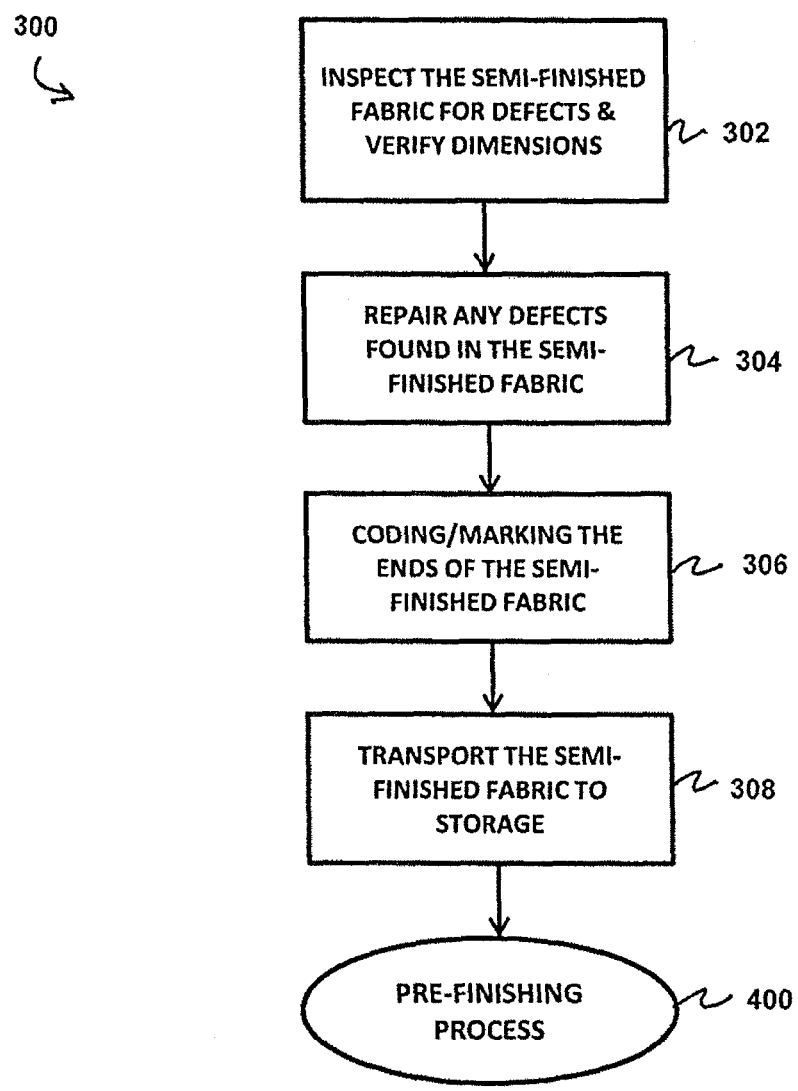
FIG. 10 is a block diagram showing an inspection process for inspecting a semi-finished wool pile fabric for defects and impurities.

Referring now to FIG. 10, the semi-finished pile fabric 218 is inspected in an inspection process 300 to verify the dimensions of the semi-finished pile fabric and to check for any irregularities, defects and deformities. Specifically, in an initial inspection step 302, a first one of the semi-finished pile fabrics 218 or "greiges" is loaded into an inspection machine to check the dimensions of the semi-finished pile fabric. Preferably, the present method utilizes two inspection machines to inspect the semi-finished pile fabric 218. It should be appreciated that any suitable number of the inspection machines may be used to inspect the semi-finished pile fabric.

In the present method, an end of the initial piece or sheet of the semi-finished pile fabric 218 is inserted or fed into the inspection machine so the wool fibers 104 on the semi-finished pile fabric are angled toward the machine. As stated above, the fiber blowers 222 (FIG. 8) associated with each of the knitting feed devices 216 direct air against the wool fibers 104 so that a majority of the wool fibers extend or are angled in the same direction when the knitting process 200 is finished. The operator feeds the end of the semi-finished pile fabric 218 into the inspection machine so that the wool fibers 104 are angled toward the inspection machine. This end is inserted first into the inspection machine and is marked with a suitable identifier such as a letter, number or other symbol, to indicate that it is the initial of first end of the semi-finished pile fabric sheet.

In a marking step 306, the scrim 106 near the first end or feed end is marked with the letter "A" and the scrim 106 located near the opposing end or non-feed end is marked with the letter "B." It should be appreciated that other suitable symbols may be used to mark the ends of the semi-finished pile fabric. The positioning of the semi-finished pile fabric and the marking of the ends of the fabric are relevant in subsequent processing steps as described below.

The inspection machine includes a series of rollers in communication with a digital display. A sheet or length of the semi-finished pile fabric 218 is attached to and fed through the rollers of the inspection machine which measures the width and length of the product. Alternatively, the dimensions of the semi-finished pile fabric 218 are manually measured. If the semi-finished pile fabric 218 is not within pre-determined tolerances for the length and width, the product is rejected. Additionally, while the semi-finished pile fabric 218 is being fed through the inspection machine, an operator checks the scrim 106 for missed stitches, holes or other defects. If a defect is detected, the operator stops the inspection machine and manually repairs the defect using a needle and thread or other suitable repairing tools in a repairing step 304. The defects may also be automatically repaired by one or more repairing machines. The operator may also check other parameters of the semi-finished pile fabric 218 including, but not limited to, the density and softness of the product. If no defects are found by the operator and the semi-finished pile fabric has the designated length and width, the fabric is transferred to a storage area (step 308), such as a warehouse or storage room, for further processing.

Figure 11:
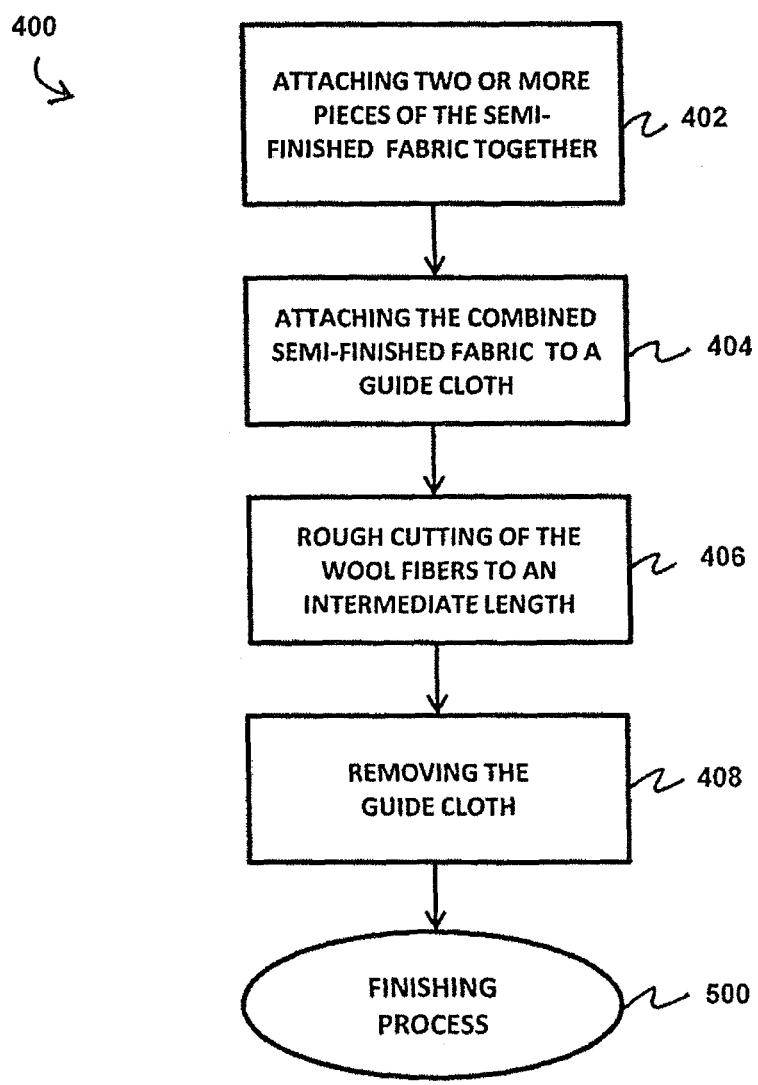
FIG. 11 is a block diagram showing a pre-finishing process for performing a rough cut and straightening of the wool fibers of the semi-finished wool pile fabric.

Referring now to FIG. 11, in a pre-finishing process 400, two or more pieces or sheets of the semi-finished pile fabric 218 (FIG. 9) are attached, i.e., stitched, together end-to-end in an attachment step 402 by an overlock stitching machine to combine the semi-finished pile fabric sheets based on a designated overall length of the wool pile fabric 102 needed for a particular application. As stated above, the wool fibers 104 of each of the pieces of the semi-finished pile fabric 218 are generally angled in a single direction. Thus, the pieces of the semi-finished pile fabric are attached together so the wool fibers 104 of each of the pieces all extend or are angled in the same direction, i.e., the ends marked with an "A" of one semi-finished pile fabric piece is attached to the ends marked with a "B" of the preceding fabric piece. The directional alignment of the wool fibers 104 on the connected semi-finished pile fabric sheets is relevant in the shearing processes described below.

Figure 12:
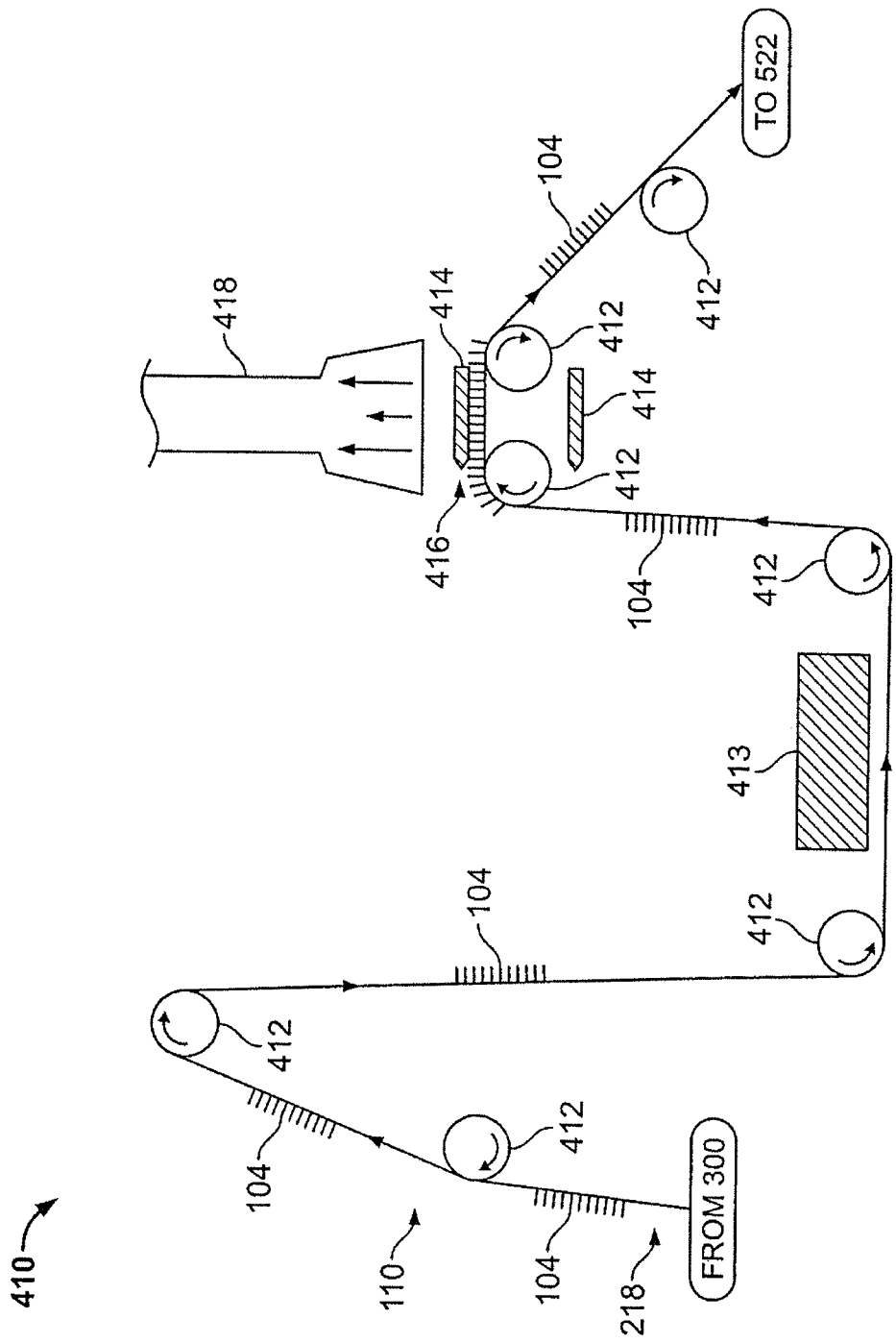
FIG. 12 is a schematic diagram of an embodiment of a tigering machine having a belt-like cutting blade.

Referring to FIGS. 11 and 12, the combined semi-finished pile fabric 218 now goes through a rough shearing or cutting step 406 to begin the process of shearing the wool fibers 104 to a final designated length. Specifically, a tigering machine 410 is used in the present method. It should be appreciated that any one or more tigering machines 410 may be used to perform the rough shearing of the combined semi-finished pile fabric 218. In this process, the assembled length of semi-finished pile fabric is temporarily attached (stitched) to a guide cloth (step 404) by the overlock stitching machine. The guide cloth can be a waste piece of pile fabric that didn't pass the inspection process or another textile piece. The guide cloth is initially fed through the tigering machine 410 to adjust the tension of the rollers and other parameters of the process before the semi-finished pile fabric 218 is fed through the tigering machine. Using a guide cloth avoids unnecessary damage to the semi-finished pile fabric 218, prevents waste and thereby reduces material costs.

A series of rollers 412 and a frame portion 413 in each tigering machine 410 guide the length of semi-finished pile fabric 218 through a rotating belt-type metal cutting blade 414 that is positioned transverse to the longitudinal axis of the length of semi-finished pile fabric 218. The rotating cutting blade 414 is configured as a rotating belt that loops around the semi-finished pile fabric and is driven in a clockwise or counterclockwise direction by a suitable motor. An edge of the blade 414 includes a plurality of teeth 416 that are positioned adjacent to the semi-finished pile fabric 218 for shearing the wool fibers. Specifically, the cutting blade 414 cuts the wool fibers 104 to a designated rough length in a rough shearing/cutting step 406. The rough length is longer than the designated or desired final length of the wool fibers 104 in the wool pile fabric 102. It should be appreciated that the position of the cutting blade 414 relative to the wool fibers 104 of the semi-finished pile fabric 218 may be manually adjusted to control the rough length of the wool fibers. The tigering machine also includes an exhaust duct 418 that suctions and removes fibers and other airborne particles during the cutting operation. After the rough shearing/cutting step 406 is completed, the guide cloth is split or removed from the end of the combined semi-finished pile fabric (step 408) and the product is either stored or transported to a finishing area for performing the finishing process 500.

The combined semi-finished pile fabric has a relatively smooth back side 108 and an opposing fleece or wool fiber side 110 having wool fibers 104 that replicate natural sheepskin. At this stage the wool is rough and bristly. To prepare the semi-finished pile fabric 218 for end product manufacturing such as footwear, the fabric goes through the finishing process 500.

Figure 13:
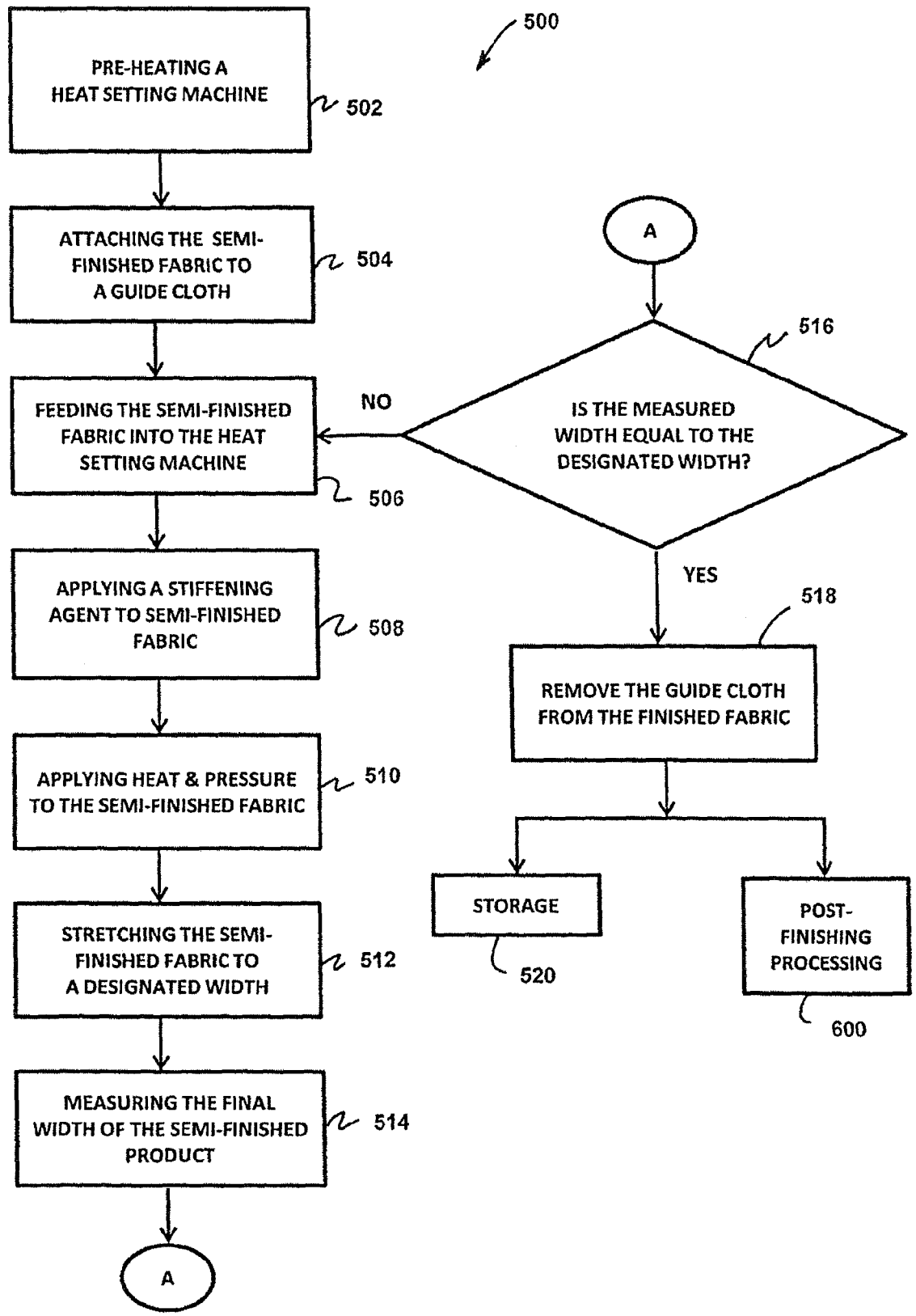
FIG. 13 is a block diagram showing a finishing process for performing the final conditioning and processing of the semi-finished wool pile fabric.
Figure 14:
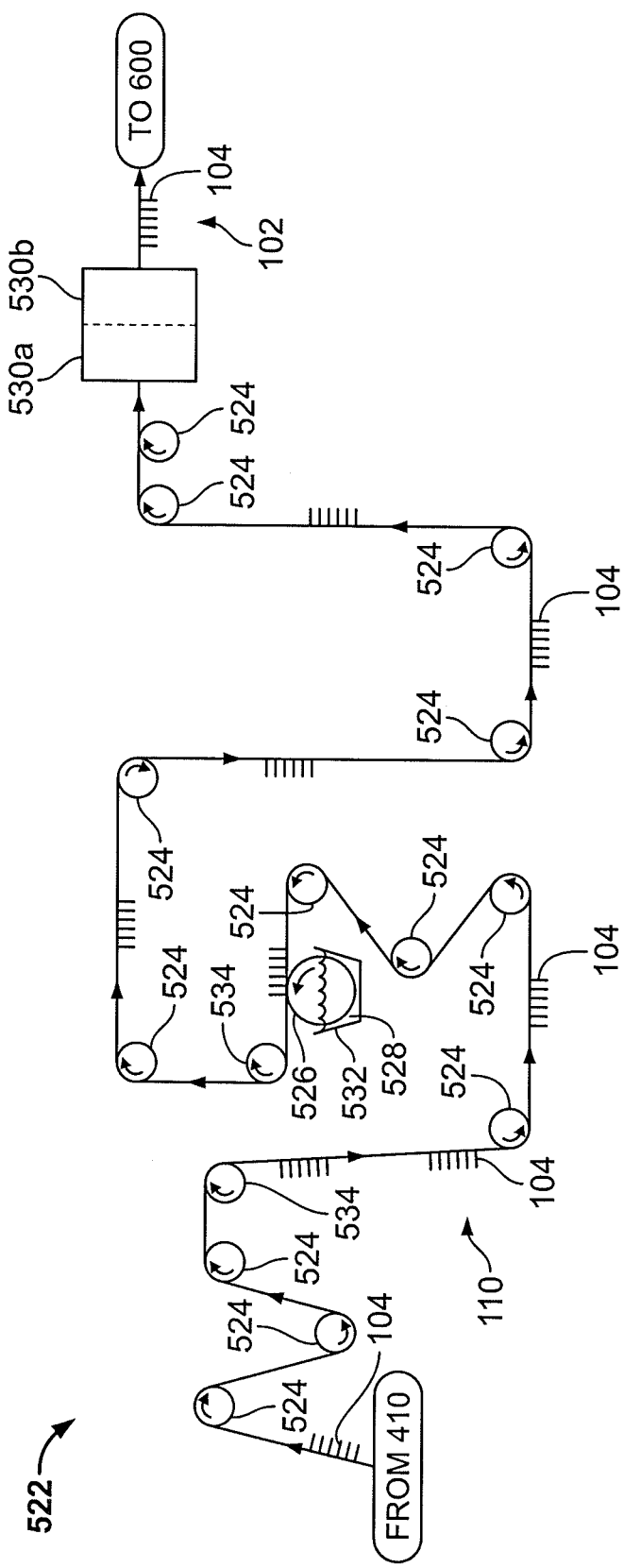
FIG. 14 is a schematic diagram of an embodiment of a heat setting machine for applying a stiffening solution to the scrim of the semi-finished wool pile fabric.

Referring now to FIGS. 13 and 14, in the finishing process 500, the semi-finished pile fabric 218 is heated and stretched to a designated final width by one or more machines. In this embodiment, the semi-finished pile fabric 218 is passed through a heat setting machine 522 for stretching the semi-finished pile fabric 218 to the designated or desired width. As shown in FIG. 14, the heat setting machine 522 includes a series of rollers 524 and a frame portion 525 to guide and move the semi-finished pile fabric 218 adjacent to a coating applicator, i.e., roll 526, that applies a back side coating or stiffening solution 528 including a stiffening agent to the scrim 106 and then conveys the fabric through multiple ovens 530 for curing or setting the coating. In one embodiment, the heat setting machine includes series of eight ovens. It should be appreciated that another suitable number of ovens may be used to dry and set the conditioning solution on the scrim 106.

Initially in a pre-heating step 502, the heat setting machine 522 is activated and a plurality of the ovens 530a are pre-heated to a predetermined preferred temperature of 140° C. and one or more ovens 530b following the ovens 530a are pre-heated to a predetermined preferred temperature of 114° C. It should be appreciated that the temperature of ovens 530a can be in the range of about 134° to 143° C. and that the temperature of each oven or ovens 530b can be in the range of about 110° to 118° C. It should also be appreciated that other suitable temperatures can be used depending on operating and ambient conditions provided that the temperature is not so hot so as to damage the semi-finished pile fabric 218. In this embodiment, the ovens 530 are heated by steam.

When the ovens 530 reach the respective predetermined temperatures, a guide cloth is temporally attached to the semi-finished pile fabric 218 (step 504) by an overlock stitching machine or other suitable stitching machine as described above and then fed into the heat setting machine 522 (step 506). The guide cloth enables the operator to adjust the roller tension and the oven temperatures of the heat setting machine before the semi-finished pile fabric 218 is fed through the machine to prevent unnecessary damage to and waste of the semi-finished pile fabric. In coating step 508, at least one applicator roll 526 applies a stiffening solution or agent 528 to the scrim 106 of the semi-finished wool product, as the semi-finished pile fabric 218 is fed into the heat setting machine 522. As shown in FIG. 14, a trough 532 holds a bath of stiffening solution 528. Applicator roll 526 is positioned at least partially in the trough. Roll 526 rotates within trough 532 and stiffening solution 528 adheres to the outer surface of the roll. Roll 526 contacts the scrim 106 of the semi-finished pile fabric 218 to apply the stiffening solution to the scrim. The stiffening solution 528 fixes the knit structure of the scrim, helps bond the wool fibers within the scrim, and reduces the stretchability of the scrim 106 and thereby the stretchability of the semi-finished pile fabric 218. In an embodiment, the stiffening solution 528 includes an impermeable stiffener (30%), a permeable stiffener (50%) and a polyacrylic emulsion (20%). It should be appreciated that the relative quantities of component ingredients may be adjusted depending on operating conditions. Also other agents may be added to the solution, and alternative stiffing solutions as known in the art as later developed can be used.

After the stiffening solution 528 is applied, the semi-finished pile fabric is stretched 510, preferably using at least one and more preferably two metal rollers 534, each having a helical protrusion and groove. Steam is applied to the semi-finished pile fabric 218 while stretching the product lengthwise, which narrows the width of the product from an initial width of about 1.9 m to a width in the range of 1.3 to 1.4 m (step 512). In this embodiment, the semi-finished pile fabric is fed through the heated rollers (heated to a temperature of about 130° C.) at a speed of about 8 m/min. The speed and temperature of the heated rollers 534 may be adjusted as necessary to achieve a desired product width. An opposing series of rotating pins at least partially penetrate the edges of the fabric, simultaneously stretching the width of the fabric while guiding the fabric through the ovens 530 to achieve a final width of 1.50 to 1.55 m.

After exiting the heat setting machine 522, the width of the wool pile fabric 102 is measured as a final check in step 516. If the width is not within acceptable tolerance limits, the finished product is re-fed into the heat setting machine 522 (step 506) a second time and steps 508, 510 and 512 are repeated to further stretch the finished product to the desired final width. It should be appreciated that the semi-finished pile fabric 218 may be coated with the stiffening solution and passed through the heat setting machine one or a plurality of times to achieve a finished product having the designated final width. When the finished product 102 is at the designated final width, the guide cloth is removed (step 518) and the finished product is either stored for future processing (step 520) or transported to the post-finishing process 600.

At this stage, the wool fiber side of pile fabric 102 is coarse and bristly, and generally unsuitable for use in many products including footwear and apparel where the wool fibers will come into contact with a wearer's skin. In the present method, the wool pile fabric is finished in an unconventional manner that is conceptually more similar to natural sheepskin finishing processes as contrasted with conventional textile finishing processes. Heretofore, natural sheepskin finishing processes have not been used on pile fabrics or other textiles. However, unlike natural sheepskin finishing processes, where individual skins are finished one at a time, automated, continuous web processing machinery and equipment have been developed to finish the length of pile fabric in a high speed, efficient manner. After the finishing process the wool pile fabric is soft to the touch and closely resembles natural shearling fleece in feel and appearance.

Figure 16:
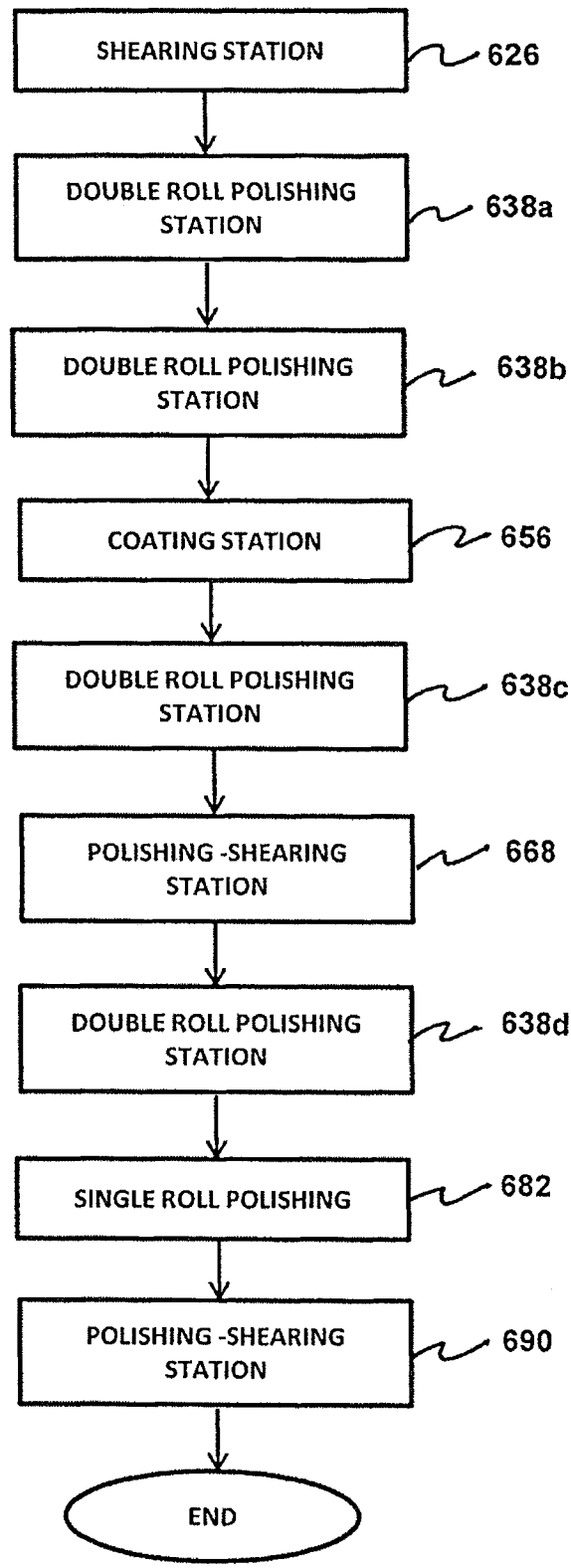
FIG. 16 is a block diagram showing the sequence of the post-finishing process machines.

Referring now to FIG. 16, in the post-finishing process 600, the wool pile fabric 102 is fed through a sequence of post-finishing machines including one or more tigering machines, two double polishing roll stations, a coater station, a double polishing roll station, a combined polishing-shearing station, a double polishing roll station, a single polishing roll station and a polishing-shearing. The post-finishing process 600 softens and polishes (shines) the wool fibers 104 to replicate the feel and appearance of natural fleece.

Figure 17:
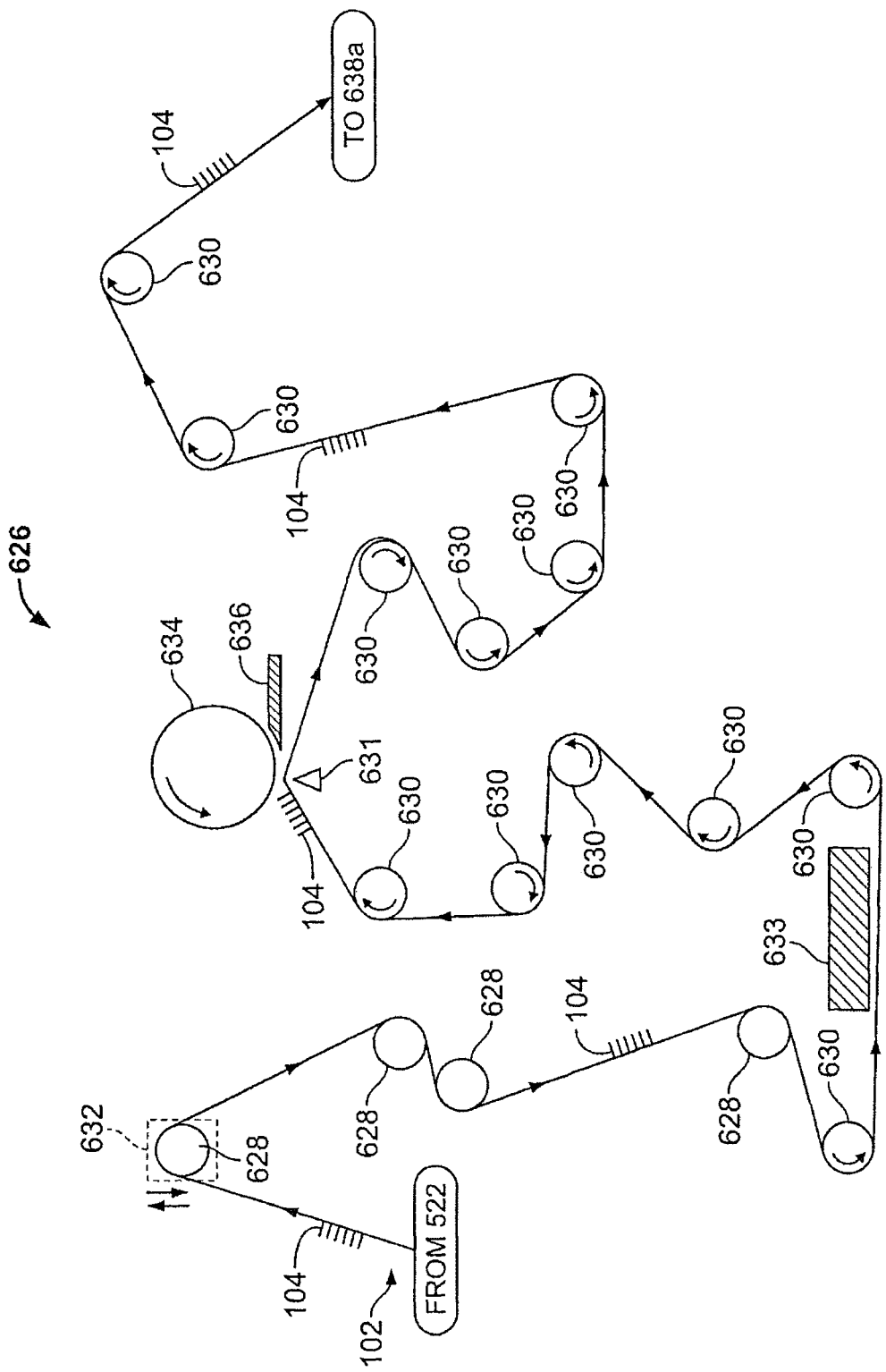
FIG. 17 is a schematic diagram showing an embodiment of a tigering machine used in the post-finishing process.

Referring now to FIGS. 15-22, initially, the pile fabric 102 is temporarily attached to a guide cloth (step 602) as described above and fed through a cutting station including one or more tigering machines or other suitable cutting/shearing machines. In this embodiment, the fabric 102 is fed through a tigering machines 626 (step 604). As shown in FIG. 17, tigering machine 626 includes a series of fixed guides 628 (which in this embodiment are stationary, smooth steel cylinders), guide rollers 630, a fixed guide 631 and a frame portion 633 that guides and conveys fabric 102 through the tigering machine. At least one of the guides 628 is attached to a guide arm 632 that is pivotally connected to the machine frame for laterally adjusting the fabric run. It should be appreciated that the guide rollers may be cylindrical rollers, a rotating belt driven by two or more rollers or any suitable moving or rotating guide. It should also be noted that the wool fibers 104 are attached to the entire surface of the fabric 102 even though the figures only show portions of the fabric having the wool fibers. In the figures, the wool fibers 104 have been added to portions of the fabric 102 to identify the wool fiber and the scrim sides of the fabric while allowing the path of the fabric through the machines to be easily followed.

As shown in FIG. 17, fabric 102 and more specifically, the wool fiber 104 side of the fabric is guided into contact with a cutting roll 634 by guide 631 where the cutting roll preferably operates at 800-900 rpm. A cutting blade 636 is positioned next to the cutting roll that further shears or trims the wool fibers 104 to an intermediate length of approximately 18 mm in cutting step 606. It should be noted that the shearing steps in the post-finishing process 600 each perform a fine shearing of the wool fibers 104 to ultimately achieve a desired final wool fiber length, which in this embodiment is 17-18 mm. Also, it should be appreciated that the wool fibers 104 may be trimmed to other desired intermediate length or lengths, examples of which are discussed below in reference to FIGS. 27 and 29. Also, the number of wool fibers 104 in a particular area of the wool pile fabric, i.e., the fiber density, may be uniform or may vary longitudinally or transversely of the fabric.

Figure 18:
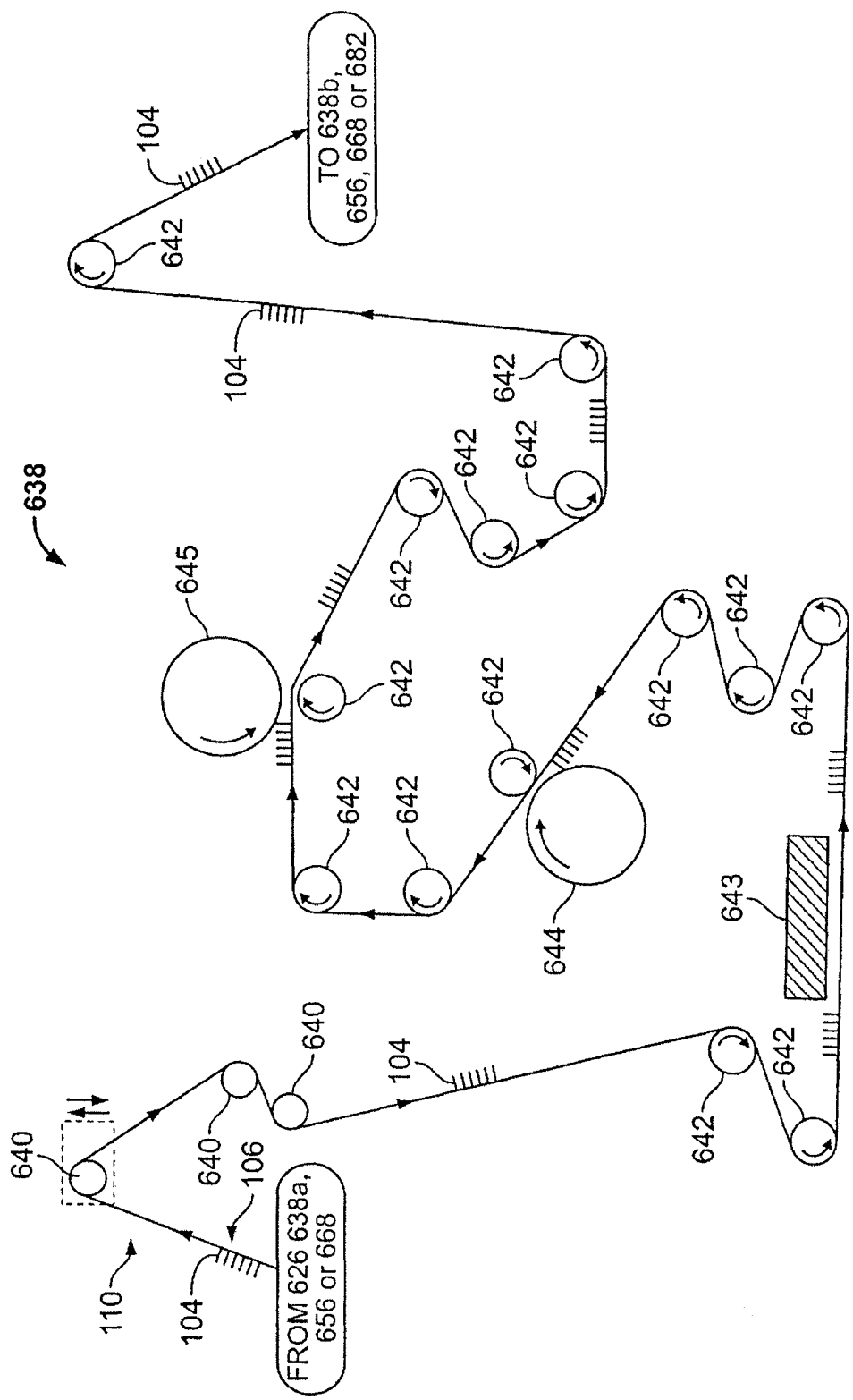
FIG. 18 is a schematic diagram showing an embodiment of a double polishing roll machine used in the post-finishing process.

After exiting the tigering machine 626, the wool pile fabric 102 goes through multiple polishing steps to soften, comb and enhance the luster of the wool fibers 104. The polishing steps are performed by one or more machines. In the present embodiment, the wool pile fabric 102 is fed through a plurality of double polishing roll stations 638a and 638b. FIG. 18 illustrates one double polishing roll station 638. The other double polishing roll stations have substantially the same configuration. Alternatively, the length of fabric can be fed though a single polishing roll station 638 two or more times. The double polishing roll station 638 includes a series of stationary guides 640, a pivoting guide 641 for aligning the fabric 102, guide rollers 642 and a frame portion 643 that guide and convey the wool pile fabric 102 and more specifically, the wool fiber side 110 of the finished fabric 102 against two independent, heated polishing rolls 644 and 645. In this embodiment, each roll operates at about 840 rpm. First roll 644 rotates in a direction opposite to the direction of travel of the length of fabric, while second roll 645 rotates in the same direction of travel as the fabric. The rolls rake the wool pile side of the fabric to remove crimps from the ends of the wool fibers 104 and frictionally engage and thereby initially polish and comb the wool fibers 104. The different direction of rotation of the rolls helps avoid a directional lay of the wool fibers. In the present embodiment, the feed rate of the wool pile fabric 102 through each of the first two double polishing roller machines is about 6.0-8.0 m/min and the temperature of the first polishing roll 644 is about 250° C. and the second polishing roll 645 is slightly cooler at about 240° C. Because the first roll heats the wool pile, the temperature of the wool pile fabric entering the second roll is somewhat warmer than entering the first roll. It should be appreciated that the polishing rolls 644 and 645 may be set at a temperature sufficient to polish the wool fibers 104 of the pile fabric 102 but not so hot as to damage the fibers.

Figure 19:
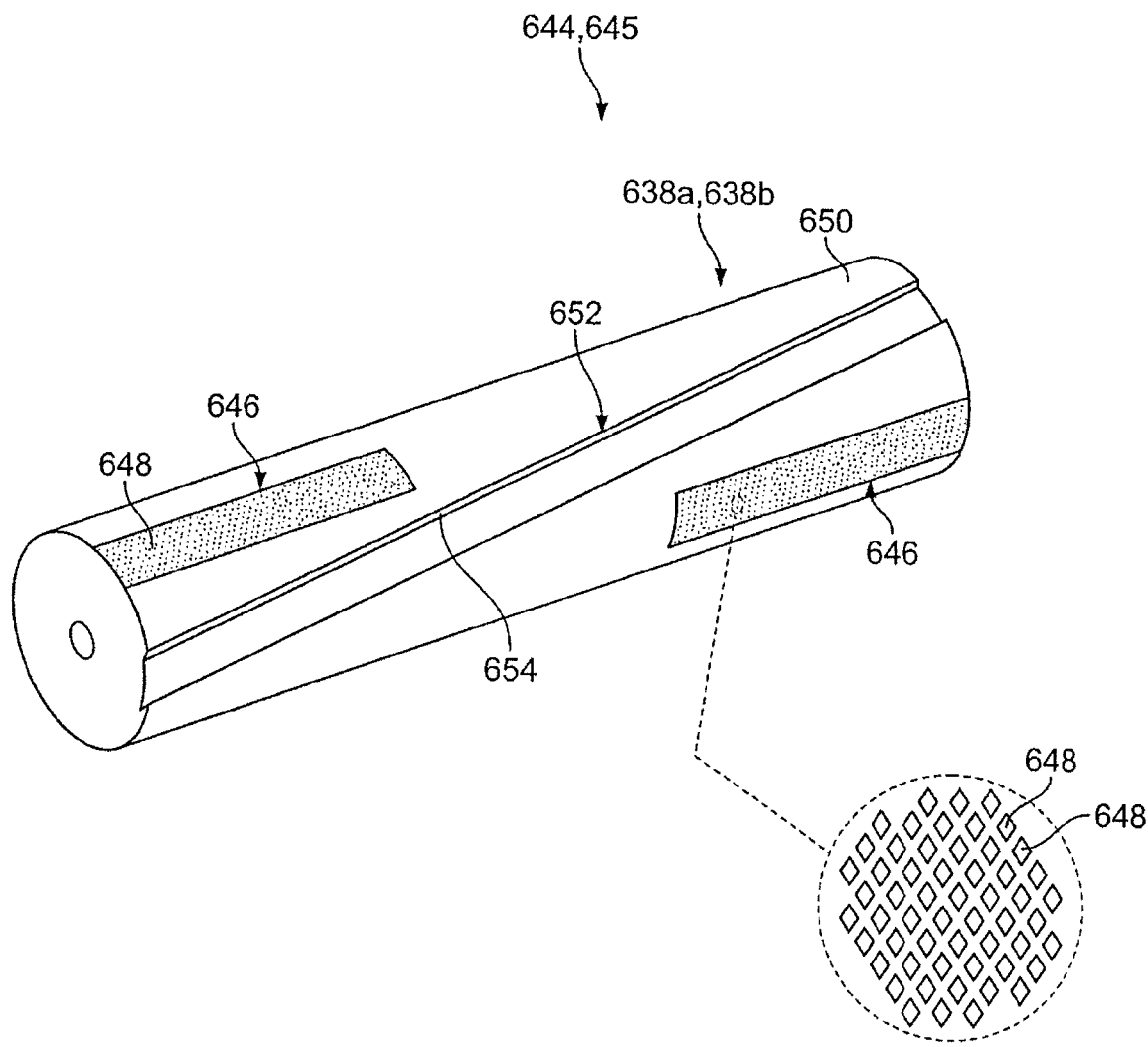
FIG. 19 is a perspective view of a polishing roll.

Referring now to FIG. 19, in order to effectively polish the wool fibers 104 of the pile fabric 102, each of the polishing rolls 644, 645 include a plurality of pairs of segmented blades 646 where the blades in each pair are positioned on opposing sides of the roll. The segmented blades 646 each include a multiplicity of diamond-shaped protrusions or teeth 648 (see the enlarged inset of the protrusions) that extend at least 5 mm outwardly from the outer roll surface 650. It should be appreciated that the protrusions 648 may have other suitable shapes and may extend at any suitable distance from the roll surface 650. The protrusions 648 of the blades 646 contact, and more specifically, at least partially comb or rake the wool fibers 104 and in combination with the heated outer surface 650 of the roll, polish the wool fibers. To help control the temperature of the wool fibers 104 contacting the roll surface 650, a recessed chute or groove 652 is provided on the roll in between each of the pairs of blades 646 to reduce the surface area of the roll that is in contact with the wool fibers 104. Otherwise, the heated roll surface 650 could overheat and damage the wool fibers. Additionally, a leading edge or lip 654 of the grooves 652 contacts the wool fibers 104 to further polish the fibers.

In a finish coating step 610, a conditioning, polishing or finish coating 658 is applied to the wool fibers 104 to enhance the luster and softness of the wool fibers as well as improve the anti-static properties of the fibers. Coating 658 may be a sheepskin conditioning solution as known in the art for softening, conditioning and improving the luster of natural shearling fleece. In an embodiment, a finish coating 658 includes a polishing agent (22%), a softening agent (15%), alcohol (17%), a hot stamping agent (10%) and water (36%). The polishing agent enhances the glossiness and luster of the wool fibers. The alcohol and the softening agent enhance the softness and feel of the fibers and the hot stamping agent includes a silicone oil that increases the smoothness and straightens the fibers. It should be appreciated that the relative proportions of the above agents may be adjusted to suit particular operating conditions, that other suitable agents could be added, and that other conditioning coatings as known in the art or later developed could be used in place thereof.

Figure 20:
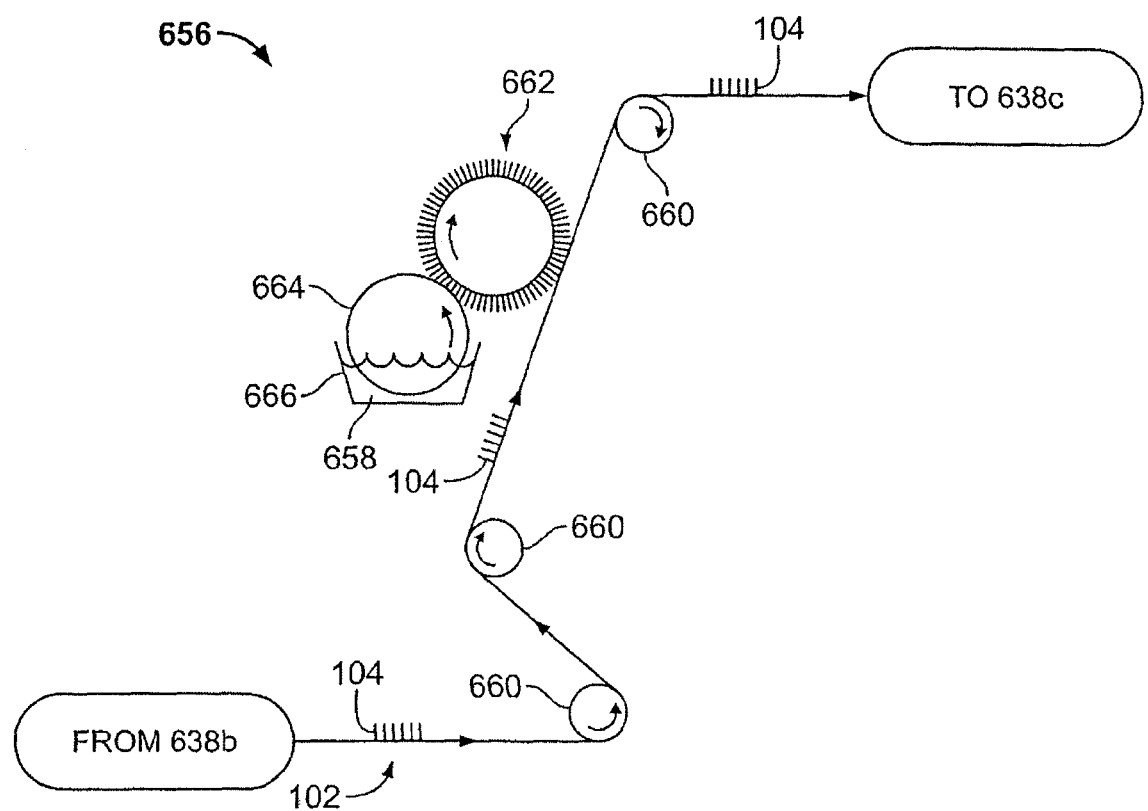
FIG. 20 is a schematic diagram showing an embodiment of a polishing coating machine used in the post-finishing process.

As shown in FIG. 20, the coating is preferably applied at a coating station 656 including a series of guide rollers 660 and a coating applicator roll 662 having an outer brush surface. The applicator roll 662 is positioned adjacent to a supply or metering roll 664 which transfers the finish coating 658 from trough 666 to the applicator roll. It should be appreciated that the coating station 656 may include one or more supply rolls 664 and coating applicator rolls 662 to apply a desired volume or coating weight to the wool fibers 104 of the wool pile fabric 102.

After the finish coating 658 is applied to the wool pile side of fabric 102, the wetted fabric is guided or fed through a third double polishing roll station 638c to force the coating toward the base of the wool fibers, to further remove any remaining crimping on the wool fiber ends and to polish the fiber ends (see step 612). It should be appreciated that the polishing steps may be performed by one or more of the double polishing roll stations where each of the stations includes at least one heated roll. In the illustrated embodiment, the operation of the third double polishing roll station 638c is similar to the double polishing roller stations 638 described above and therefore will not be repeated here. In the present embodiment, the feed rate of the fabric 102 through this machine is 6.0 m/min and the temperature of the front roll 644 is about 245° C. and the rear roll 645 is slightly cooler at about 235° C. Also, the rotational speed of each of the two polishing rolls in the third double roller polishing station is 840 rpm. It should be appreciated that the feed rate and the temperature and rotational speed of the front and rear rolls may be adjusted as necessary.

Figure 21:
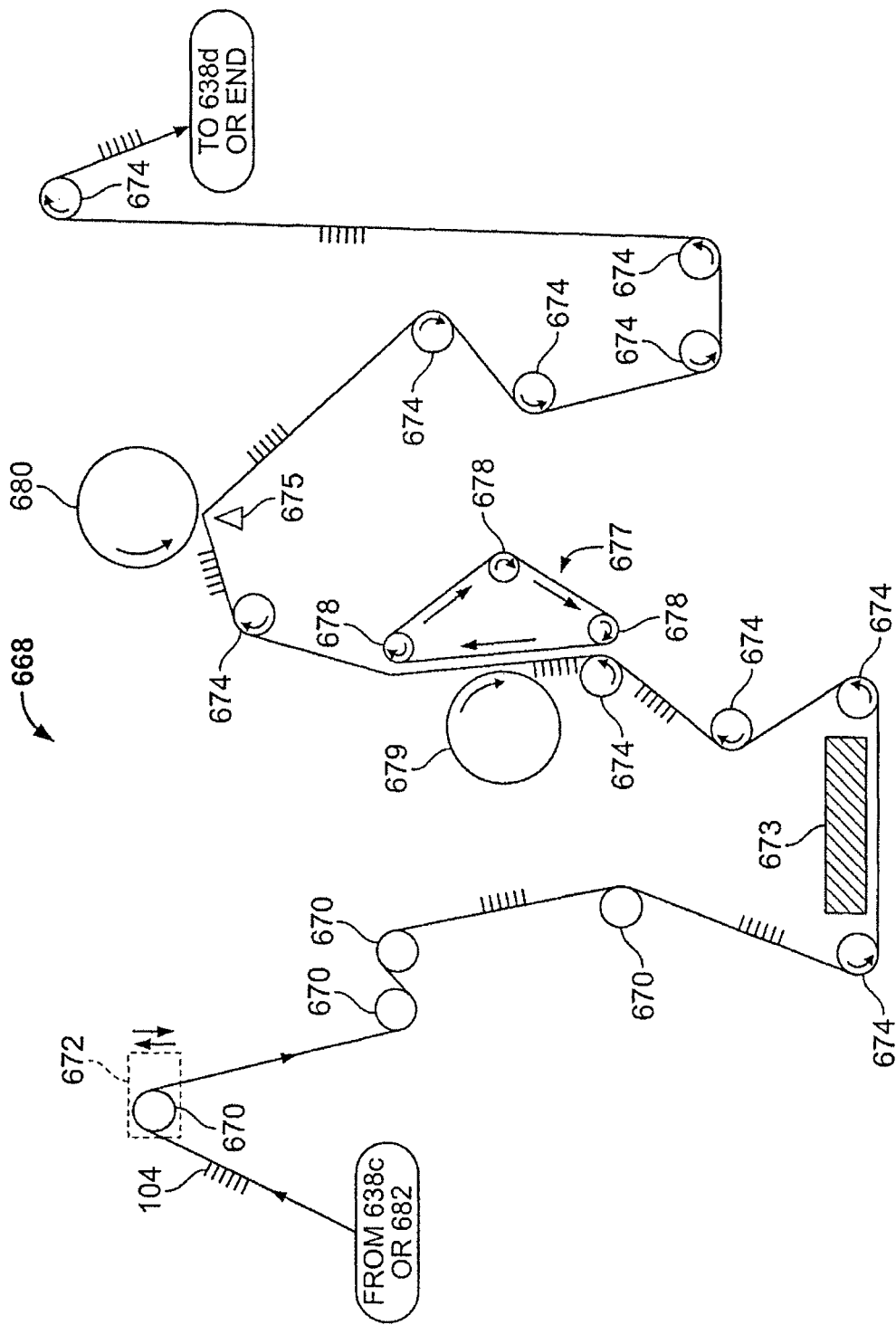
FIG. 21 is a schematic diagram showing an embodiment of a polishing shearing machine used in the post-finishing process.
Figure 22:
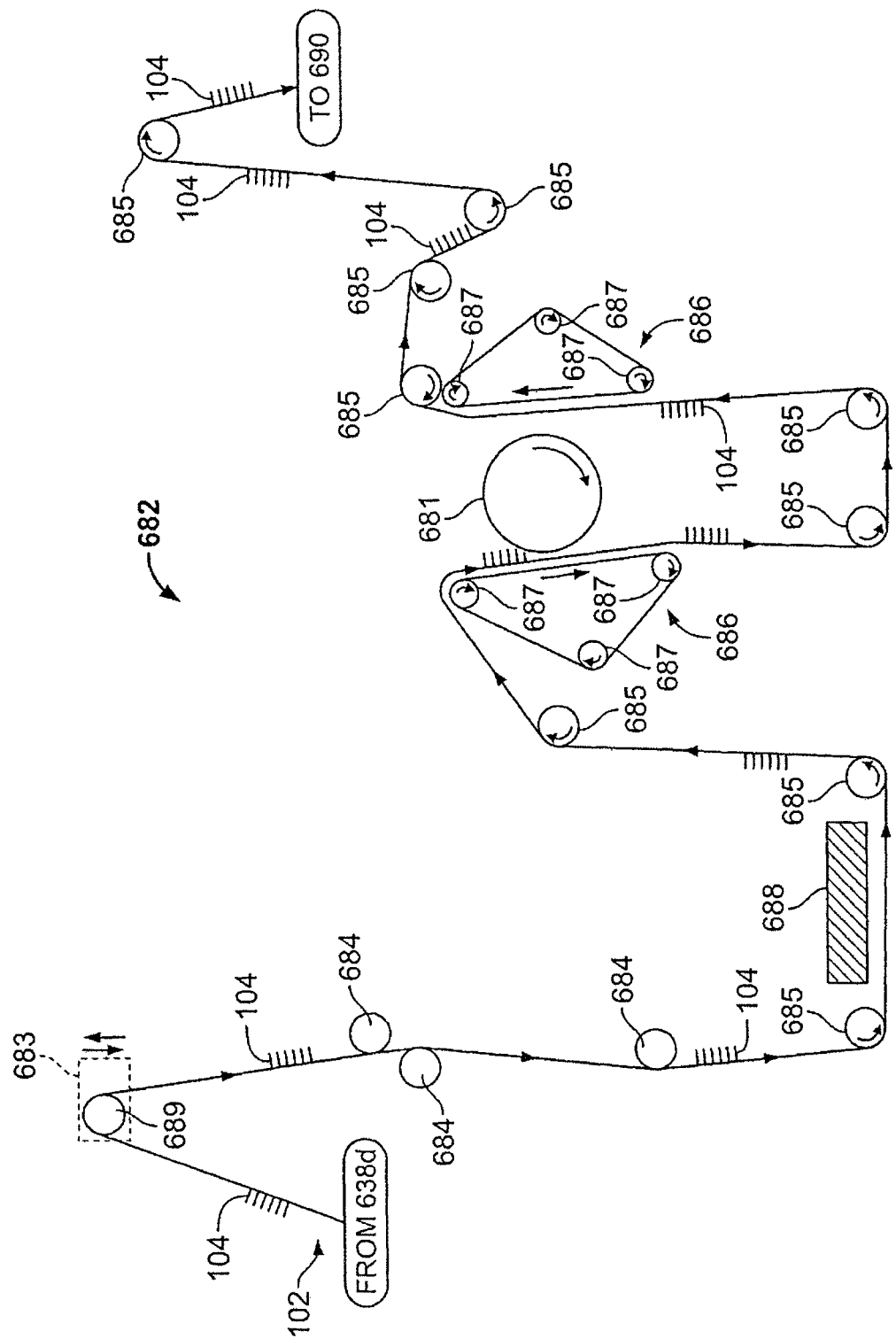
FIG. 22 is a schematic diagram showing an embodiment of a single polishing roller machine used in the post-finishing process.

Referring now to FIGS. 16 and 21, fabric 102 is guided through a polishing and shearing station 668 having one or more machines to ensure the consistency and uniformity of the length of wool fibers 104. As shown in FIG. 21, the polishing and shearing station 668 includes a series of guides 670, a pivoting guide 672 for aligning the wool pile fabric 102, a frame portion 673, guide rollers 674 and a nip 675 for guiding and moving the fabric through the machine. A continuous belt 677 driven by a plurality of rollers 678 presses fabric 102 into contact with polishing roll 679. Polishing roll 679 has the same construction as the polishing roll described in FIG. 19 but is driven to rotate in a direction opposite of the fabric travel. After the wool fibers 104 are polished by the polishing roll 679, the wool pile fabric is engaged by a shearing roll 680 having a spiral protruding blade that further cuts the wool fibers 104 to a second intermediate length. The wool pile fabric 102 exits the polishing and shearing station 668 for yet another polishing step with a double polishing roll station 638 as shown in FIG. 16.

The luster and softness of the wool fibers 104 of the wool pile fabric 102 are further enhanced by providing a fourth polishing step via a double polishing roll station 638*d*. The operation of this double polishing roll step is described above where in this embodiment, the front roll 644 is heated to a temperature of 230° C. and the rear roll 645 is heated to a slightly cooler temperature of 225° C.

The wool pile fabric 102 is now optionally guided through a single polishing roll station 682 including a single heated polishing roll 681, which in this embodiment, is heated to a temperature of 215° C. The roll 681 is constructed and operates in the same way as the polishing roll shown in FIG. 21, i.e., rotating in a direction opposite fabric travel, and described above for removing any remaining crimping on the ends of the wool fibers 104 of the pile fabric 102. Specifically, the station 682 includes a guide 689 on a pivoting arm 683 for aligning the wool pile fabric 102 and a series of stationary guides 684, guide rollers 685, guide belts 686 driven by drive rollers 687 and a frame portion 688.

After this polishing stage, the wool pile fabric 102 undergoes a final shearing step at polishing-shearing station 690. This station performs the same as or similar to polishing-shearing station 668 as described above and more specifically, performs final shearing and polishing of the wool fibers to achieve the wool pile fabric parameters. The polishing roll in this machine is heated to a temperature of 205° C. while the machine shears the wool fibers to a predetermined final length, which in this embodiment is 17-18 mm.

An additional optional post-finishing process includes tumbling that curls the wool fibers 104 of the wool pile fabric 102. A tumbling machine includes a housing and a door slidably or pivotably attached to the housing that provides access to a heated drum-type roller (similar to a clothes dryer) configured to receive the wool pile fabric. The wool pile fabric 102 is inserted into the drum roller and the drum roller is heated to a predetermined temperature and rotated for a designated period time. When the tumbling process is finished, the wool fibers of the wool pile fabric 102 are uniformly curled.

After the post-finishing process is finished, the wool pile fabric 102 is transported to a storage area (step 622) or to a shipping area (step 624) for shipping to another location such as a distributor or end product manufacturer such as a footwear manufacturer.

Figure 15:
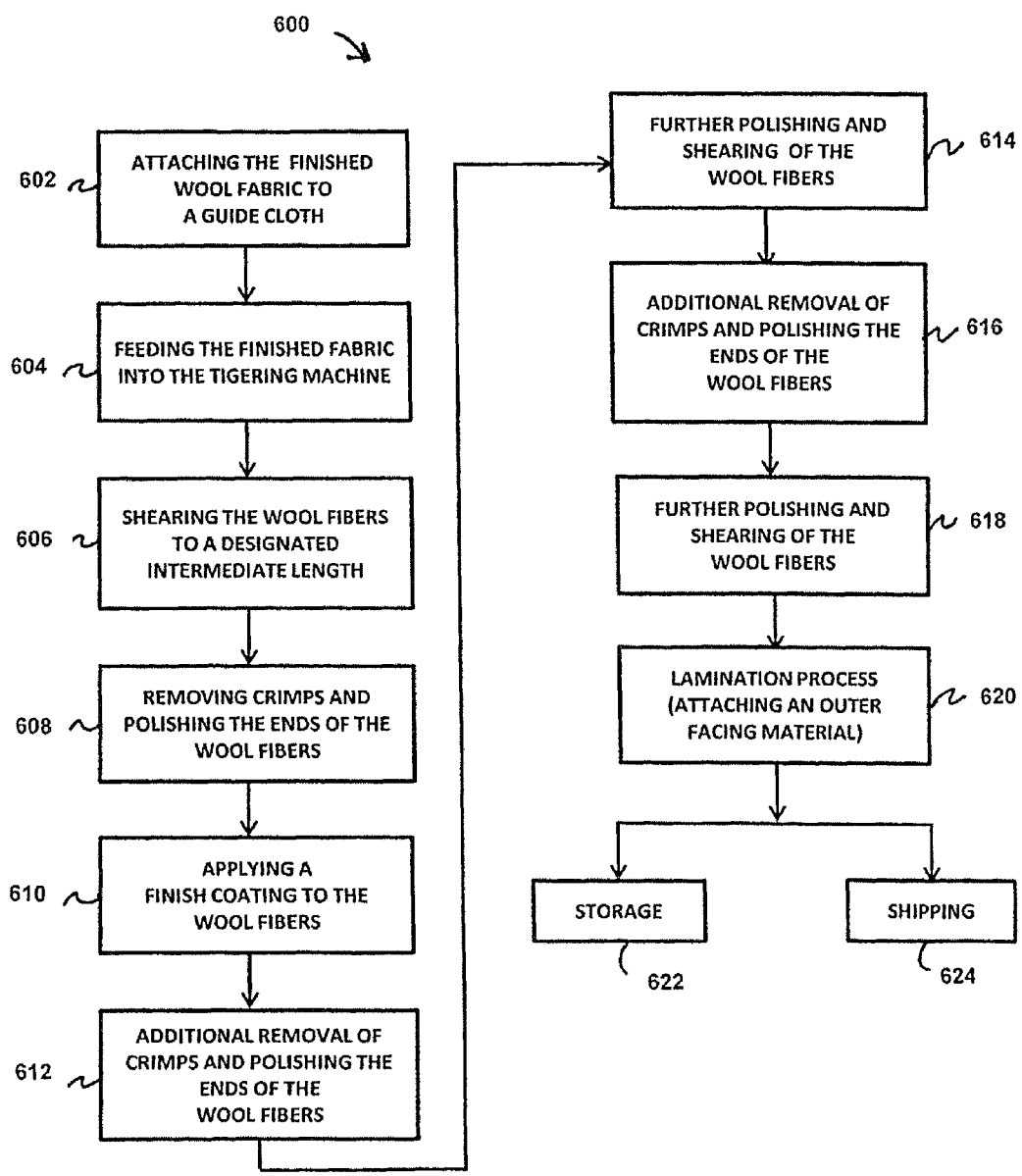
FIG. 15 is a block diagram showing a post-finishing process for performing the final processing of the finished wool pile fabric.
Figure 23:
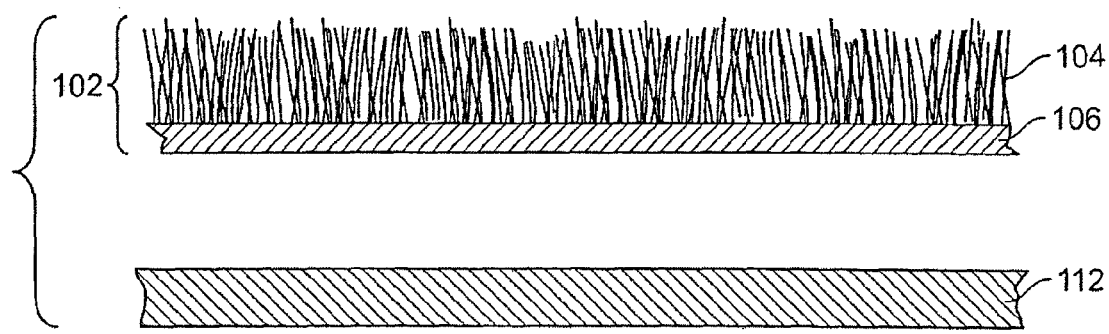
FIG. 23 is an exploded view of the finished wool pile fabric product of FIG. 3.

Typically, the scrim 106 of the wool pile fabric 102 does not have a desirable appearance to be used as the outer surface of an end product such as footwear. Accordingly as shown in FIG. 23, the wool pile fabric 102 is optionally attached to a suitable facing material 112 in a lamination step 620 (FIG. 15). In the lamination process, a facing material is glued, sewn or otherwise attached to the scrim to enhance the finished product. An example wool pile fabric 102 laminated to a facing is shown in FIG. 3. It should be appreciated that the terms "facing" and "facing material" are used herein to refer to an outer layer of natural or artificial material. It should be appreciated that the facing material 112 may be any suitable material, including but not limited to, ethylene vinyl acetate (EVA), vinyl, leather, suede, fabric, textile, synthetic leather, synthetic suede or other suitable natural or synthetic material or combination of these materials.

Figure 24:
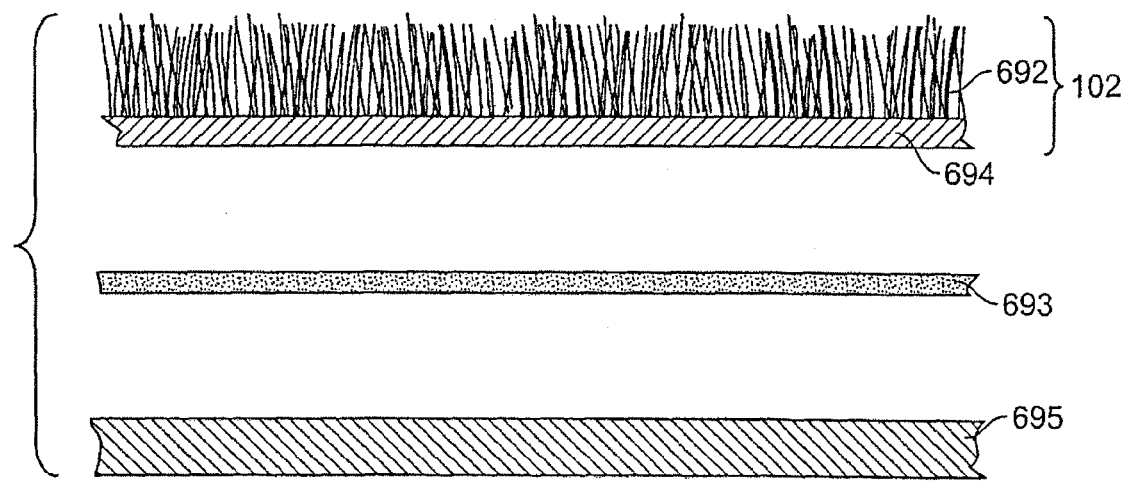
FIG. 24 is an exploded view of a finished wool pile fabric product including an intermediate layer.

Referring now to FIG. 24, an enlarged, exploded view of another embodiment 691 is illustrated where the wool pile fabric includes wool fibers 692 and one or more intermediate layers 693 positioned and attached between the scrim 694 and the facing material 695. In one example, the intermediate layer 693 is a waterproof material layer to inhibit water and moisture from moving into the fleece side. In another example, the intermediate layer 693 is an insulating material layer. It should be appreciated that the intermediate layer or layers 693 may be made with any suitable material or combination of materials.

Figure 1:
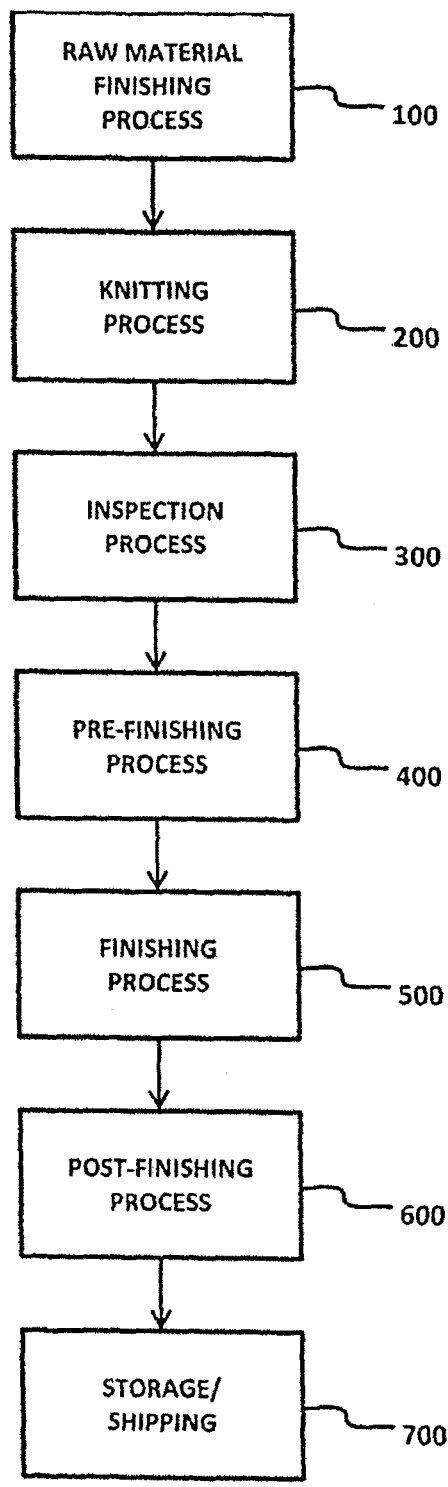
FIG. 1 is a block diagram showing basic processes for making a wool pile fabric of the present invention.
Figure 25:
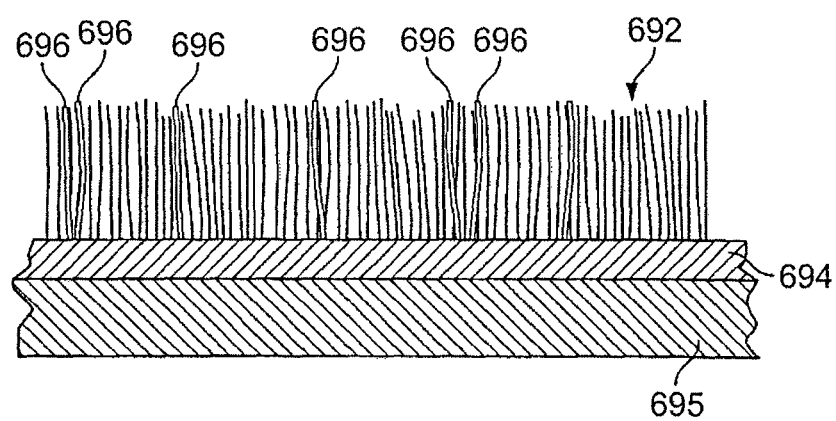
FIG. 25 is a cross-section view of a finished wool pile fabric product including the fibers mixed with the wool and non-wool fibers.

Referring now to FIG. 25, in a further embodiment, wool fibers can be blended with non-wool fibers 696 by mixing the fibers in the raw material finishing process step 100 (see FIG. 1). The non-wool fibers 696 may include natural or artificial fibers such as phase change fibers, sensitive fibers and odor reducing fibers. Phase change fibers are used to manage the temperature of the pile fabric made from the combination or blend of phase change and wool fibers. For example, the phase change fibers cause the fleece to feel cooler than fleece to adjust to varying temperatures in different parts of the world and at different seasons (winter, spring, summer and fall). Sensitive fibers make the fleece feel softer where the softness of the fleece can be adjusted by adjusting the amount of the sensitive fibers mixed with the wool fibers 692. Odor reducing fibers include zinc oxide that inhibits bacteria growth on the fleece that may be present from sweat and other elements. Preventing or limiting the amount of bacteria on the fleece, eliminates or reduces the odor of the fleece. It should be appreciated that other suitable fibers may be mixed with the wool fibers 692 and that any suitable amount or mixture of the above processed fibers 696 with the wool fibers 692 may be used in embodiments of the sheared wool processing method described above.

Figure 26:
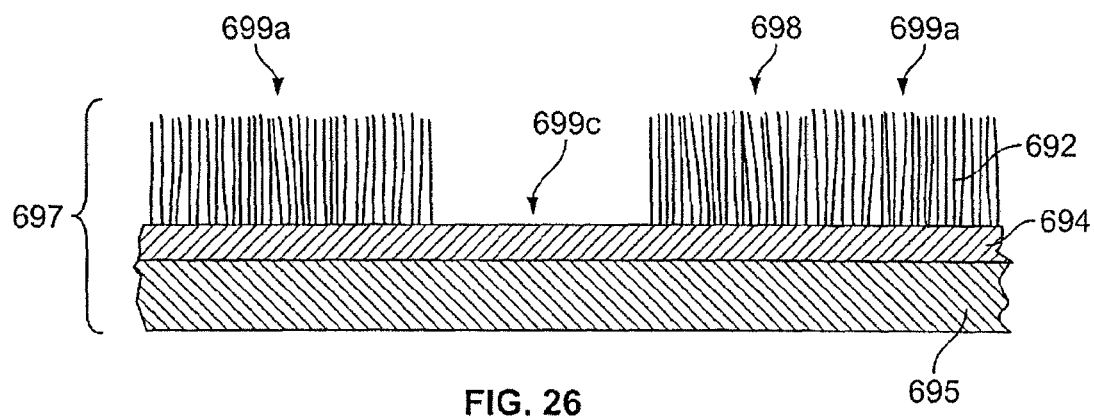
FIG. 26 is a cross-section view of a wool pile fabric embodiment including sections with wool fibers and at least one section with no wool fibers.
Figure 27:
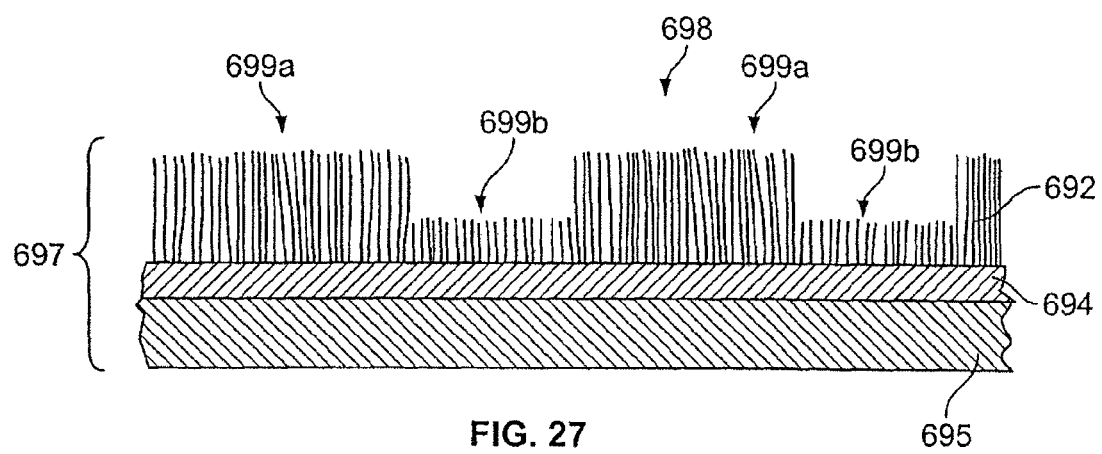
FIG. 27 is a cross-section view of the finished wool pile fabric embodiment including wool fibers having different lengths.

Referring to FIGS. 26 and 27, in another embodiment, the wool pile fabric 697, and more specifically, the pile side 698 of the wool pile fabric 697 is made with wool fibers 692 having different lengths or sections of the wool fibers having different lengths. For example, in FIG. 27, the pile side 698 includes alternating sections including sections 699*a* with wool fibers 692 having a length of 0.7 mm and sections 699*b* with fibers having a length of 0.1 mm. In another example shown in FIG. 26, the pile side 698 has wool pile sections 699*a* separated by bare sections 699*c* with little or no fibers 692. It should be appreciated that the pile side 698 of the semi-finished wool product may include sections having any suitable wool fiber length or sections having no wool fibers. It should also be appreciated that the above fleece sections may be sections having the same wool fibers 692, a mixture of wool fibers 692 and the non-wool fibers 696 (FIGS. 25A and 25B) discussed above or solely the processed fibers 696. The varying lengths of the sections and the sections having no fibers allow for air flow through the fleece, such as in a liner of a boot or a shoe, to enhance user comfort and temperature control.

In another embodiment, the fleece side 698 of the semi-finished wool product or the wool pile fabric 697 includes one or more sections having wool fibers 692 of different densities (i.e., the number of wool fibers 692 per square inch), which helps control the air flow through the fleece on the fleece side 698. In one example, the length and/or density of the fibers 692 of the wool pile fabric 697 is different in the forefoot region, ball region or heel of footwear for controlling the comfort level and support in different regions or sections of footwear. It should be appreciated that the number of fibers 692 in a particular area or areas on the scrim 694, i.e., the density, may be uniform or may vary along a length, a width or in any suitable pattern on the scrim.

Figure 28:
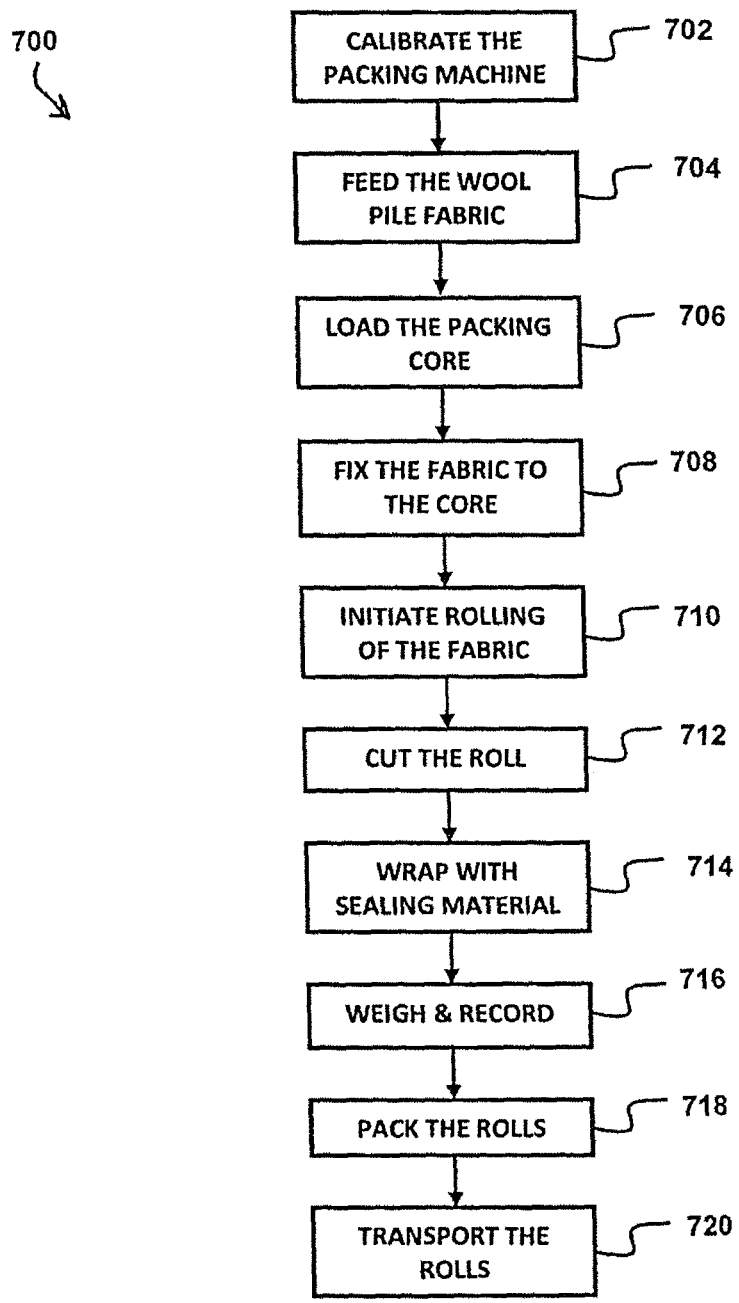
FIG. 28 is a block diagram showing the shipping process for the finished wool pile fabric product.
Figure 29:
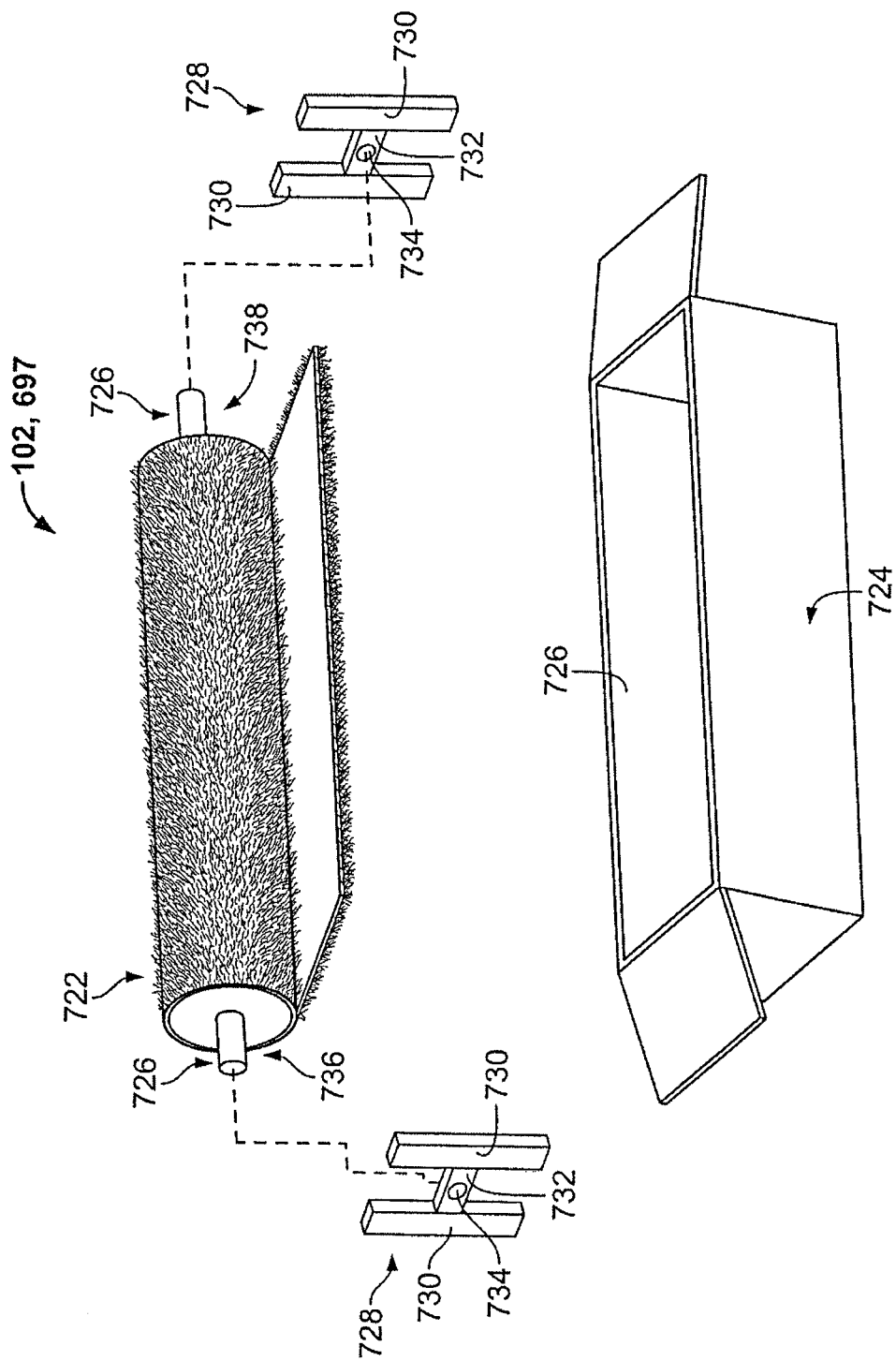
FIG. 29 is an exploded perspective view of an embodiment of a shipping container for shipping a roll of wool pile fabric.

Referring now to FIGS. 28-29, after the wool pile fabric has been manufactured, it can be prepared for shipment to warehouses, product manufacturers, such as apparel and footwear manufacturers, distribution facilities or other facilities for end processing and distribution in the storage/shipping process 700 (FIG. 1).

Specifically, the wool pile fabric 697 is prepared for shipping to maintain the appearance and integrity of the product 697. Initially, a calibration step 702 is performed where the tension of the packing machine is calibrated to ensure that it is within designated standards for packing the wool pile fabric. After calibrating the packing machine, the wool pile fabric 697 is fed into the packing machine utilizing a series of rollers. In a product feed step 704, the wool pile fabric 697 is fed through one or more rollers of the packing machine as needed to hold the product. In this regard, the rollers hold and guide the wool pile fabric 697 for packing as described below.

After the wool pile fabric 697 is in place, a core loading step 706 is performed where a core or tube made of a durable material such as durable plastic or a high density cardboard is inserted or loaded onto a feed roller of the packing machine. The length and diameter of the tube is determined by the width and length of the wool pile fabric to be shipped. In this regard, an end of the wool pile fabric 697 is fixed to the tube by fasteners in a fixing step 708, such as nails or staples, or any other suitable connectors or connection methods. Subsequently, a portion of the wool pile fabric 697 is wrapped about the tube prior to activating, i.e., turning on, the packing machine. It should be appreciated that any suitable length or amount of the wool pile fabric may be initially wrapped about the tube.

When the wool pile fabric 697 is secured to the tube, a wrapping or rolling step 710 is performed where the packing machine is activated or turned "on," which causes a primary roller or feed roller to rotate in a clockwise direction. The rotation of the feed roller pulls the wool pile fabric 697 toward the roller so that it wraps onto the tube. The wrapping of the wool pile fabric 697 onto the tube continues until a designated or desired amount of the product has been wrapped onto the tube. Alternatively, the packing machine can be programmed to operate for a designated amount of time that equates to a predetermined amount of wool pile fabric 697 wrapped onto the tube. The operating time is based on designated parameters input into the packing machine such as roller velocity and thickness of the wool pile fabric 697. After the desired amount of the wool pile fabric 697 is wrapped onto the tube, a cutting step 712 is performed when an end of the wool pile fabric 697 is manually cut or cut by an automated cutting device associated with the packing machine. The wool pile fabric 697 is then wrapped with a sealing material in a sealing step 714, such as a polyethylene cloth or polyethylene material, to keep the wool pile fabric 697 clean and free from any debris during shipping.

Prior to being shipped, a weighing and measuring step 716 is performed where certain information about the wool pile fabric 697 and the wool pile fabric roll(s) 722 are measured and recorded. Specifically, each of the wool pile fabric rolls 722 are weighed and measured and either manually recorded or entered into a memory device of a processor such as a computer. This information is used to ensure that the correct product roll or rolls 722 are shipped to the correct warehouses, distributors and end manufacturers and manufacturing locations. In this embodiment, the wool pile fabric roll(s) 722 each have a length between 47.5 feet and 54.1 feet (14.5 m and 16.5 m). It should be appreciated that the wool pile fabric rolls 722 may be any suitable length or weight and have any suitable diameter.

In a packing step 718, wool pile fabric roll(s) 722 are removed from the packing machine, either manually or by an unloading device such as a forklift, and packed in a suitable container such as a shipping container 724 made of cardboard. It should be appreciated that the shipping container can be made out of wood, plastic or any other suitable material. Preferably, the wool pile fabric roll 722 is suspended within each container 724 so that the wool fibers 692 do not contact and get flattened by an inner surface 726 of the container. Contact with the container 724 could also damage the wool fibers during shipping. In an embodiment, the core or central tube 726 on which the wool pile fabric is wrapped, extends outwardly a designated distance from each end of the wool pile fabric. It should be appreciated that wool pile fabric roll(s) 722 may be suspended in shipping containers 724 using any alternate packaging that does not damage the wool pile.

A generally H-shaped roll support 728 is inserted over each end of the wool pile fabric roll 722 to support the product roll above an underlying surface. Specifically, each roll support 728 includes two side beams 730 and a horizontal beam 732 extending between a central portion of each of the side beams. The horizontal beam 732 defines a central opening 734 that corresponds to the size and shape of the central tube 726 of the wool pile fabric roll 722. Thus, a first roll support 728 is positioned on a first end 736 of the wool pile fabric roll 722 so that the first end extends through the central opening 734 of the roll support. Similarly, a second roll support 728 is positioned on a second, opposing end 738 of the wool pile fabric roll 722 so that the second end extends through the central opening of the corresponding roll support.

As stated above, after the wool pile fabric roll(s) 722 are each weighed and measured and attached to the roll supports 728, and the product roll 722 and the roll supports 728 are lifted and positioned in the shipping container 724 as described above in the packing step 718 where the shipping container has a size and shape to receive the product roll and corresponding roll supports. The roll supports suspend and support the product roll in the shipping container. It should be appreciated that one or more of the shipping containers 724 may have a size and shape to support one or more of the wool pile fabric rolls 722 and roll supports 728 to secure the product rolls in each container 724. In a shipping step 720, the packed wool pile fabric rolls 722 are shipped or transported to a warehouse, distributor or manufacturer for subsequent processing and distribution.

After being shipped, wool pile fabric (102, 697) on the product roll(s) 722 is used to make different end products such as footwear, apparel, i.e., coats, gloves, hats, and other products. In one example, the wool pile fabric (102, 697) is used as a liner for footwear, apparel and other products in lieu of conventional sheepskin.

While particular embodiments of the present method have been described herein, it will be appreciated by those skilled in the art that changes and modifications may be made thereto without departing from the invention in its broader aspects.

What is claimed is:
1. A method of making a sheared wool, deep pile fabric that closely resembles natural sheepskin fleece, comprising,
   forming a length of wool pile fabric having natural wool fibers on one side and a scrim on an opposing side, and finishing the wool pile fabric as natural sheepskin, including, polishing the wool fiber side of the pile fabric by guiding the length of pile fabric over plural heated first polishing rolls, applying a sheepskin conditioning solution to the wool fiber side of the pile fabric, further polishing the wool fiber side of the pile fabric by guiding the fabric a plurality of times over plural second heated polishing rolls, and cutting the wool fibers to a designated length.

2. The method of claim 1, wherein at least one of the first and second polishing rolls in between the polishing and further polishing steps comprises a plurality of blades, each blade having a multiplicity of teeth for raking the wool fiber side of the fabric.

3. The method of claim 1, wherein each of the polishing rolls in both of the polishing and further polishing steps comprises a plurality of blades, each blade having a multiplicity of teeth for raking the wool fiber side of the fabric.

4. The method of claim 1, wherein the polishing step is performed with a first set of plural heated rolls and the further polishing step is performed by a second set of plural heated rolls.

5. The method of claim 1, further comprising cutting the wool fibers to an intermediate length prior to cutting the wool fibers to the designated length.

6. The method of claim 1, wherein the wool fibers are treated prior to the forming step by:
providing a batch of sheared wool fibers,
applying a mixing solution to the fibers,
mixing the wool fibers with applied mixing solution,
carding the wool fibers and forming a web of wool fibers, and
slivering the web.

7. The method of claim 6, wherein the mixing solution comprises a mineral oil, an anti-static agent and water.

8. A method of making a sheared wool pile fabric comprising:
combining wool fibers with a yarn to form a length of wool pile fabric having a wool fiber pile on one side and a textile scrim on an opposing side,
rough shearing the wool fiber side of the fabric to a first predetermined length of the wool fibers,
applying a polishing coating to the wool fiber side of the fabric,
polishing the wool fiber side by passing the fabric over at least two heated rolls,
fine shearing the wool fiber side of the web to a second predetermined length of the wool fibers.

9. The method of claim 8, wherein the rough shearing, applying, polishing and fine shearing steps are performed in an automated, substantially continuous process on the length of fabric travelling at a speed of at least 6 meters per minute.

10. The method of claim 8, wherein the combining step comprises simultaneously knitting the wool fibers with the yarn.

11. The method of claim 8, wherein the combining step comprises forming a continuous tubular piece of fabric and slitting the tubular piece of fabric to form said length of wool pile fabric.

12. The method of claim 8, further comprising a step of applying a back side coating to the textile scrim after the combining step and before the polishing step, the back side coating including a stiffening agent.

13. The method of claim 8, further comprising an initial polishing step of passing the wool fiber side of the web over at least two heated rolls after the rough shearing step and prior to the step of applying the polishing solution.

14. The method of claim 8, wherein the polishing coating comprises a polishing agent, a softening agent, alcohol, a hot stamping agent and water.

15. The method of claim 8, further comprising an initial polishing step of passing the wool fiber side of the fabric over a first set of heated double rolls, followed by passing the wool fiber side of the fabric over a second set of heating double rolls prior to the applying step.

16. The method according to claim 8, wherein in the polishing step the rolls are heated to at least 235 degrees C. and the fabric is passed at a speed of 6 to 8 meters per minute.

17. The method of claim 8, wherein the fine shearing step comprises passing the web through a combined polishing and shearing machine.

18. The method of claim 8, wherein the fine shearing step comprises passing the fabric through a combined polishing and shearing machine, polishing the wool fiber side of the fabric with at least one heated roll, and passing the fabric a second time through the combined polishing and shearing machine.

19. A method of making a wool fleece product comprising:
providing wool slivers comprised of sheared wool fibers,
knitting the wool fibers with a yarn to form a length of semi-finished wool pile fabric having a wool pile on one side and a textile scrim on an opposing side,
rough shearing the wool fleece side of the web to a first length of the wool fibers,
polishing the wool pile side by passing the fabric through a first set of at least two rolls heated to at least 240 degrees C.,
applying a polishing coating to the wool pile side of the fabric,
polishing the wool pile side by passing the fabric through a second set of at least two rolls heated to at least 235 degrees C.,
shearing the wool pile side of the fabric to a second wool fiber length, wherein the second wool fiber length is less than the first wool fiber length,
polishing the wool pile side by passing the fabric through a third set of at least two rolls heated to at least 225 degrees C.,
further polishing the wool fleece side of the web with at least one additional roll heated to temperature of at least 215 degrees C., and
shearing the wool pile side of the fabric to a final wool fiber length, wherein the final wool fiber length is less than the second wool fiber length.

20. The method of claim 19, wherein at least one of the first and second rolls in each of the first, second and third sets of rolls and said additional roll comprise a plurality of blades, each blade having a multiplicity of teeth for raking the wool fiber side of the fabric.

21. The method of claim 19, wherein the knitting step comprises simultaneously knitting the wool fibers with the yarn to form a continuous tubular piece of fabric and slitting the tubular piece of fabric to said length of wool pile fabric.

* * * * *